(12) United States Patent
Mitsui

(10) Patent No.: US 12,301,029 B2
(45) Date of Patent: May 13, 2025

(54) POWER SUPPLY SYSTEM AND CONTROL DEVICE

(71) Applicant: TOYOTA JIDOSHA KABUSHIKI KAISHA, Toyota (JP)

(72) Inventor: Masahiko Mitsui, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 626 days.

(21) Appl. No.: 17/696,239

(22) Filed: Mar. 16, 2022

(65) Prior Publication Data

US 2022/0311250 A1 Sep. 29, 2022

(30) Foreign Application Priority Data

Mar. 26, 2021 (JP) .................................. 2021-53230

(51) Int. Cl.
*H02J 7/00* (2006.01)

(52) U.S. Cl.
CPC .......... *H02J 7/0019* (2013.01); *H02J 7/0048* (2020.01); *H02J 7/0031* (2013.01)

(58) Field of Classification Search
None
See application file for complete search history.

(56) References Cited

U.S. PATENT DOCUMENTS

| 2007/0262746 A1* | 11/2007 | Kang .................. H01M 50/569 901/50 |
| 2014/0009117 A1* | 1/2014 | Ishii ......................... H02J 3/32 320/126 |
| 2019/0267896 A1 | 8/2019 | Goto et al. |
| 2020/0028375 A1* | 1/2020 | Ono .................... H01M 10/441 |
| 2020/0169080 A1 | 5/2020 | Yasoshima et al. |

FOREIGN PATENT DOCUMENTS

| JP | 2018-074709 A | 5/2018 |
| JP | 2020-089141 A | 6/2020 |
| WO | 2013/179810 A1 | 12/2013 |

* cited by examiner

*Primary Examiner* — Arun C Williams
(74) *Attorney, Agent, or Firm* — Dinsmore & Shohl LLP

(57) ABSTRACT

A control device classifies a plurality of batteries included in a battery string into a first battery (e.g., Ni-MH) and a second battery (e.g., LiB). When a predetermined first condition is satisfied, the control device connects, to a power supply circuit, only the first battery among the batteries included in the battery string. When a predetermined second condition is satisfied, the control device connects, to the power supply circuit, only the second battery among the batteries included in the battery string.

6 Claims, 17 Drawing Sheets

《OPERATING STATE》

《DELAY PERIOD》

《STOP PERIOD》

《Li OUTPUT》

《Ni OUTPUT》

《Ni&Li CHARGING AND DISCHARGING》

POWER SUPPLY SYSTEM AND CONTROL DEVICE

CROSS REFERENCE TO RELATED APPLICATIONS

This nonprovisional application is based on Japanese Patent Application No. 2021-053230 filed on Mar. 26, 2021 with the Japan Patent Office, the entire contents of which are hereby incorporated by reference.

BACKGROUND

Field

The present disclosure relates to a power supply system and a control device, and more particularly, to a technique for controlling a battery string.

Description of the Background Art

Japanese Patent Laying-Open No. 2018-074709 discloses a power supply system including a power supply circuit, a battery string connectable to the power supply circuit, and a control device for controlling the battery string. The battery string includes a plurality of battery circuits connected to each other. Each of the plurality of battery circuits includes a battery in a manner connectable to and disconnectable from the power supply circuit. The control device can adjust the output voltage of the battery string to a desired level by controlling the connection and disconnection of the battery. Such a battery string can function as one power storage device. Hereinafter, each battery constituting the battery string is also referred to as a "battery element". Even if one of the battery elements fails, the battery string can operate normally as a power storage device by disconnecting the failed battery element.

SUMMARY

In recent years, from the viewpoint of environmental conservation and the like, an electrically powered vehicle mainly using electric power as a power source (for example, xEV such as a battery electrically powered vehicle or a plug-in hybrid electrically powered vehicle) tends to increase. In order to effectively use the batteries used in the electrically powered vehicle, a battery string may be manufactured using the batteries used in the electrically powered vehicle. If different types of batteries are used for each vehicle, different types of batteries may be used to manufacture the battery strings. However, Japanese Patent Laying-Open No. 2018-074709 does not provide a control device suitable for controlling a battery string (hereinafter, also referred to as a "heterogeneous battery mixture string") including dissimilar batteries in a mixed state.

The present disclosure was made to solve the problem above, and an object thereof is to provide a control device suitable for controlling a heterogeneous battery mixture string, and a power supply system including such a control device.

A power supply system according to the present disclosure includes a power supply circuit, a battery string connectable to the power supply circuit, and a control device that controls the battery string. The battery string includes a plurality of battery circuits connected to each other. Each of the plurality of battery circuits includes a battery in such a manner that the battery is connectable to and disconnectable from the power supply circuit. The control device classifies a plurality of batteries included in the battery string into at least a first battery and a second battery. When a predetermined first condition is satisfied, the control device connects, to the power supply circuit, only the first battery among the batteries included in the battery string. When a predetermined second condition is satisfied, the control device connects, to the power supply circuit, only the second battery among the batteries included in the battery string.

A control device according to the present disclosure is a control device that controls a battery string connectable to a power supply circuit. The battery string includes a plurality of battery circuits connected to each other. Each of the plurality of battery circuits includes a battery in such a manner that the battery is connectable to and disconnectable from the power supply circuit. The control device classifies a plurality of batteries included in the battery string into at least a first battery and a second battery. When a predetermined first condition is satisfied, the control device connects, to the power supply circuit, only the first battery among the batteries included in the battery string. When a predetermined second condition is satisfied, the control device connects, to the power supply circuit, only the second battery among the batteries included in the battery string.

The control device selectively connects either the first battery or the second battery to the power supply circuit. Therefore, when the control device controls a heterogeneous battery mixture string, the control device can connect only the batteries of the same type to the power supply circuit. The control device can cause the power supply circuit to output electric power appropriate for the first battery, and can also cause the power supply circuit to output electric power appropriate for the second battery. The control device enables output characteristics of the battery string to be varied to a great extent. Moreover, the control device can selectively connect only the batteries of the same type to the power supply circuit, and therefore, the control device can appropriately control even a heterogeneous battery mixture string including different types of batteries (two or more types of batteries that are significantly different in voltage from each other, for example) that cannot be activated simultaneously.

The control device may classify a plurality of batteries included in the battery string into two types (first battery and second battery) or three or more types. The first condition is a condition under which the first battery is used solely, and can be determined arbitrarily. The second condition is a condition under which the second battery is used solely, and can be determined arbitrarily. The first condition and the second condition may be determined so that either one of the first and second conditions is satisfied.

Each of the plurality of battery circuits may include the battery, a first switch connected in parallel to the battery, and a second switch connected in series to the battery. In each of the plurality of battery circuits, when the second switch is in an OFF state, the battery may be disconnected from the power supply circuit and, when the first switch is in the OFF state and the second switch is in an ON state, the battery may be connected to the power supply circuit.

The battery circuit having the above-described configuration enables batteries to be appropriately connected to and disconnected from the power supply circuit by the first switch and the second switch.

Each of the plurality of battery circuits may include a first output terminal and a second output terminal to which a battery voltage is applied when the first switch is in the OFF state and the second switch is in the ON state. The second output terminal of the battery circuit may be connected to the first output terminal of a battery circuit adjacent to the former battery circuit so that the battery circuits included in the battery string are connected to each other.

The plurality of battery circuits included in the battery string may include: a plurality of first battery circuits each including a battery classified as the first battery; and a plurality of second battery circuits each including a battery classified as the second battery. When the first condition is satisfied, the control device may transmit a first control command to the battery string. When the second condition is satisfied, the control device may transmit a second control command to the battery string. When the battery string receives the first control command, the battery string may drive the first switch and the second switch of each of the first battery circuits in such a manner that respective batteries included in the first battery circuits are connected to the power supply circuit. When the battery string receives the second control command, the battery string may drive the first switch and the second switch of each of the second battery circuits in such a manner that respective batteries included in the second battery circuits are connected to the power supply circuit.

The above-described configuration enables the first battery and the second battery included in the battery string to be appropriately distinguished and controlled.

The control device may generate a control command (first control command or second control command, for example) to the battery string, so that output power of the battery string has a target value. Each of the first switch and the second switch may be a semiconductor relay such as SSR (Solid State Relay). An example of the semiconductor relay is a field-effect transistor.

The battery string may further include: a control circuit that generates a switching signal in accordance with a control command from the control device; a first driving circuit; and a second driving circuit. The first driving circuit may drive the first switch and the second switch of each of the plurality of first battery circuits, using a first switching signal generated by the control circuit in accordance with the first control command from the control device, or using a switching signal that is delayed relative to the first switching signal. The second driving circuit may drive the first switch and the second switch of each of the plurality of second battery circuits, using a second switching signal generated by the control circuit in accordance with the second control command from the control device, or using a switching signal that is delayed relative to the second switching signal.

The above-described configuration enables the battery string including many batteries to be controlled appropriately.

The battery string may cause predetermined batteries (first batteries or second batteries, for example) to be connected successively to the power supply circuit. For example, in the battery string, driving circuits provided for respective battery circuits may be arranged from upstream to downstream in the direction in which a signal is transmitted. The driving circuit located uppermost stream may drive the first switch and the second switch of the battery circuit associated with the uppermost-stream driving circuit, in accordance with a switching signal generated based on the control command received from the control device. Each driving circuit that is not located uppermost stream may receive the switching signal from the upstream driving circuit to generate a switching signal delayed by a predetermined time relative to the received switching signal to drive the first switch and the second switch of the battery circuit associated with the former driving circuit, in accordance with the generated switching signal.

The first battery may be a nickel-metal hydride battery. The second battery may be a lithium-ion battery.

For electrically-driven vehicles that are widespread currently, either nickel-metal hydride battery or lithium-ion battery is often used as a battery storing power for driving the vehicle. The above-described power supply system can appropriately control a heterogeneous battery mixture string manufactured from both the nickel-metal hydride battery and the lithium-ion battery that were used for the electrically-driven vehicles. Thus, the batteries used for the electrically-driven vehicles can be used effectively.

In the power supply system, the second battery may be smaller in output power and larger in capacity than the first battery.

The power supply system having the above-described configuration combines the first battery of high output and low capacity with the second battery of low output and high capacity to enable output characteristics (particularly output power and output duration) of the battery string to be varied to a great extent.

When the first condition is satisfied, the control device may cause each battery connected to the power supply circuit to be discharged, while keeping connecting, to the power supply circuit, only the first battery among the batteries included in the battery string. When the second condition is satisfied, the control device may cause each battery connected to the power supply circuit to be discharged, while keeping connecting, to the power supply circuit, only the second battery among the batteries included in the battery string. When a predetermined third condition is satisfied, the control device may cause each battery connected to the power supply circuit to be discharged, while keeping connecting both the first battery and the second battery to the power supply circuit.

The above-described configuration enables the power supply circuit to selectively output one of electric power appropriate for the first battery, electric power appropriate for the second battery, and electric power appropriate for the combination of the first battery and the second battery, depending on which of the first to third conditions is satisfied. The first battery and the second battery may have respective voltages that are close to each other to such an extent that enables both the batteries to be activated simultaneously. The first to third conditions may be determined so that either one of the conditions is satisfied selectively.

When a predetermined fourth condition is satisfied, the control device may cause each battery connected to the power supply circuit to be charged and discharged repeatedly, while keeping connecting at least one of the first battery and the second battery to the power supply circuit.

The above-described power supply system may be used for energy management, for example. The control device may cause each battery connected to the power supply circuit to be charged and discharged repeatedly, to adjust the power frequency.

The power supply circuit may be electrically connectable to an external power supply. The control device may control the power supply circuit in such a manner that causes the power supply circuit to adjust electric power of the external power supply, using input and output power of the power supply circuit. The control device may determine, based on a required degree of power adjustment and a required time duration for power adjustment, whether or not each of the first condition, the second condition, the third condition, and the fourth condition is satisfied.

Depending on the required degree of power adjustment and the required time duration for power adjustment, the control device can selectively cause discharging of the first battery, discharging of the second battery, discharging of both the first battery and the second battery, and repeated charging and discharging of at least one of the first battery and the second battery. The above-described configuration facilitates appropriate power adjustment of the external power supply.

The power supply system may include a management device requesting the control device to make electric power adjustment for the external power supply. The management device may be a server managing supply and demand for the external power supply. The electric power adjustment requested to the control device by the management device may include supply of electric power for compensating for power shortage of the external power supply and adjustment of frequency of electric power supplied from the external power supply.

The foregoing and other objects, features, aspects and advantages of the present disclosure will become more apparent from the following detailed description of the present disclosure when taken in conjunction with the accompanying drawings.

DETAILED DESCRIPTION

Figure 1:
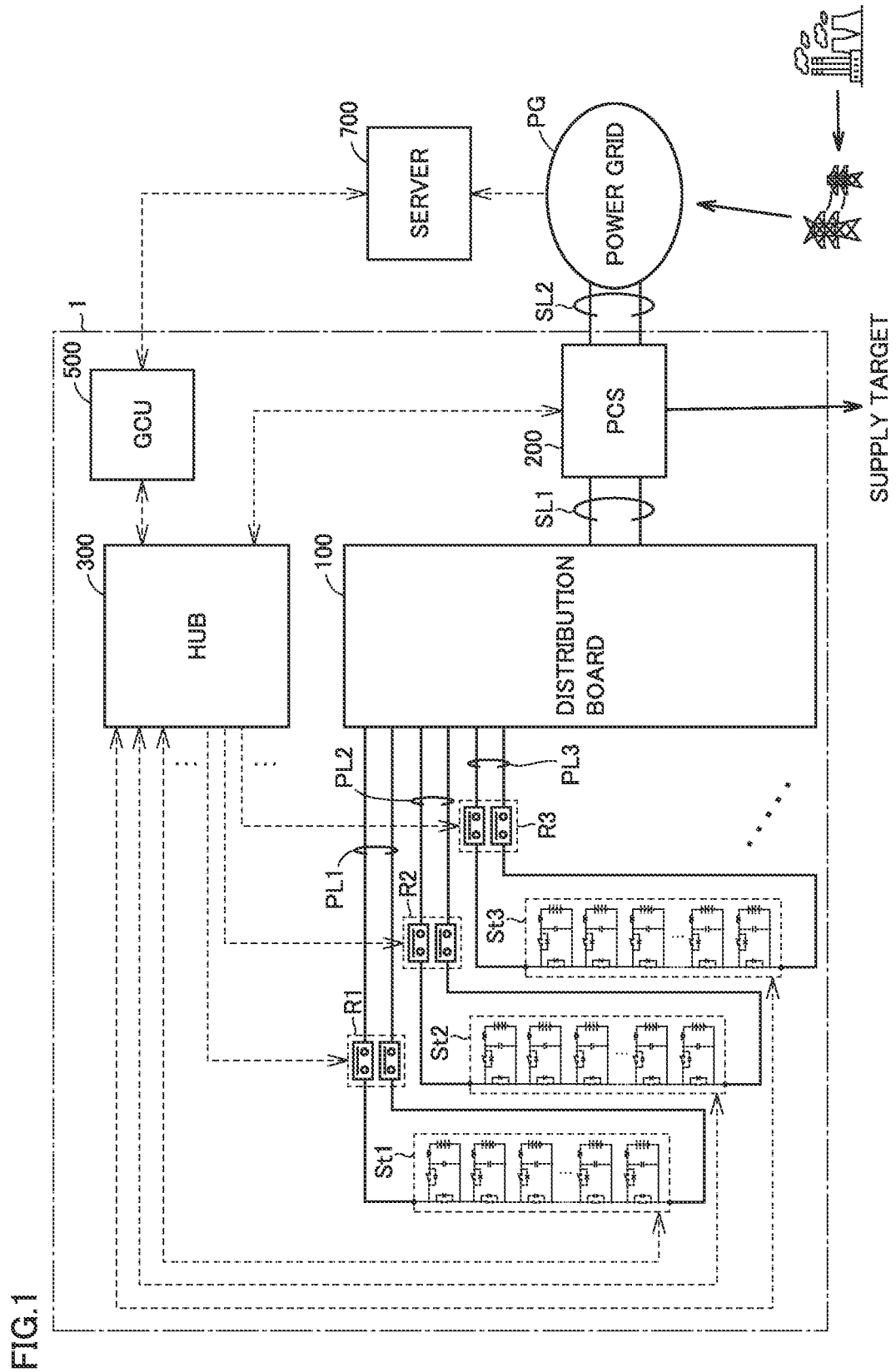
FIG. 1 is a diagram showing a configuration of a power supply system according to an embodiment of the present disclosure.

Embodiments of the present disclosure will be described in detail below with reference to the drawings. The same or corresponding elements in the drawings have the same reference characters allotted and description thereof will not be repeated. FIG. 1 is a diagram showing a configuration of a power supply system according to this embodiment. Referring to FIG. 1, power supply system 1 includes battery strings St1, St2, St3, . . . distribution board 100, PCS (Power Conditioning System) 200, HUB 300, and GCU (Group Control Unit) 500. The battery strings St1, St2, St3, . . . included in the power supply system 1 may have different configurations, but in this embodiment, they have the same configuration. Hereinafter, each of the battery strings St1, St2, St3, . . . will be referred to as a "battery string St" unless they are described in a distinguished manner.

The battery strings St1, St2, St3, . . . are connected to the distribution board 100 via electric wires PL1, PL2, PL3, . . . respectively. The electric wires PL1, PL2, PL3, . . . are respectively provided with breakers R1, R2, R3, . . . . The GCU 500 is configured to switch the connection/disconnection of the electric wires PL1, PL2, PL3, . . . by controlling ON/OFF of the breakers R1, R2, R3, . . . . A power supply circuit connectable to the battery strings St1, St2, St3, . . . is formed by the distribution board 100, the PCS 200, and the electric wires (the electric wires PL1, PL2, PL3, . . . included in the power supply system 1). The power supply circuit of the power supply system 1 is electrically connected to at least one of the supply target and the power grid PG. In the power supply system 1, the power supply circuit connected to the at least one battery string St is configured to output the power generated by the at least one battery string St to the supply target. In the power supply system 1, the power supply circuit connected to the at least one battery string St is configured to supply the power input from the power grid PG to the at least one battery string St.

As described above, the power supply circuit of the power supply system 1 is configured to be connectable to the power grid PG. Specifically, the PCS 200 included in the power supply system 1 is connected to the distribution board 100 via the power line SL1 and to the power grid PG via the power line SL2. The PCS 200 is configured to switch connection (parallel on)/disconnection (parallel off) between the power supply circuit of the power supply system 1 and the power grid PG. The power grid PG corresponds to an example of the "external power supply" according to the present disclosure.

The PCS 200 includes a power conversion device that performs predetermined power conversion on power supplied from at least one battery string St via the distribution board 100. The power converter may be an inverter that converts DC power into AC power. The PCS 200 further includes an operation control apparatus and a protection apparatus. The PCS 200 is configured to perform grid linkage control in accordance with a control command from the GCU 500 in a state where the distribution board 100 and the power grid PG are mutually connected. The PCS 200 adjusts the power supplied from the power grid PG by the power supplied from the battery string St, and outputs the adjusted power to the supply target. However, when an abnormality occurs in the power grid PG, the GCU 500 controls the PCS 200 to disconnect the distribution board 100 from the power grid PG. Thus, the power supply from the power grid PG to the supply target is stopped. Further, the GCU 500 controls the PCS 200 to supply the power supplied from the battery string St to the supply target as the emergency power. Each battery string St serves as a main power supply instead of the power grid PG until the power grid PG recovers.

In this embodiment, the house is a supply target. The PCS 200 may output power toward a distribution board (not shown) connected to wiring in a house (in-home wiring). However, the supply target is not limited to the house, and may be arbitrary. For example, the supply target may be a commercial facility. Further, the power supply system 1 may be mounted on a mobile body such as an automobile, a ship, a drone, or a spacecraft, and used as a power source for movement.

The server 700 is a server belonging to a power transmission and distribution service provider. The power grid PG is a power grid provided by a power company. The electric power company constructs an electric power network (i.e., power grid PG) by power plants and power transmission and distribution facilities, and maintains and manages the server 700 and the power grid PG. The server 700 corresponds to a management computer of the power grid PG. The server 700 manages supply and demand of the power grid PG. Power companies may benefit by conducting transactions with consumers (e.g., individuals or corporate) using power. The power grid PG supplies electric power to each consumer contracted with the electric power company, for example. The supply target in this embodiment is a house to which power is supplied from the power grid PG. The server 700 is configured to be communicable with the GCU 500, and requests the GCU 500 to adjust the power of the power grid PG as needed. The server 700 may perform DR (demand response) with respect to the GCU 500.

The GCU 500 is configured to transmit signals (e.g., control commands) to each of the PCS 200, the battery strings St1, St2, St3 . . . and the breakers R1, R2, R3 . . . via the HUB 300. The GCU 500 corresponds to an example of a "control device" according to the present disclosure. The HUB 300 includes a plurality of ports connected to the PCS 200, the GCU 500, the battery strings St1, St2, St3, . . . and the breakers R1, R2, R3, . . . , respectively. The HUB 300 is configured to electrically amplify an input signal and output the amplified signal to a specified port (i.e., destination indicated by the input signal). The HUB 300 may have a switching function.

Hereinafter, unless otherwise specified, each of the electric wires PL1, PL2, PL3, . . . will be referred to as "an electric wire PL", and each of the breakers R1, R2, R3, . . . will be referred to as "a breaker R". The breaker R may be an electromagnetic mechanical relay. The breaker R may be configured to allow a user to manually turn on/off.

Figure 2:
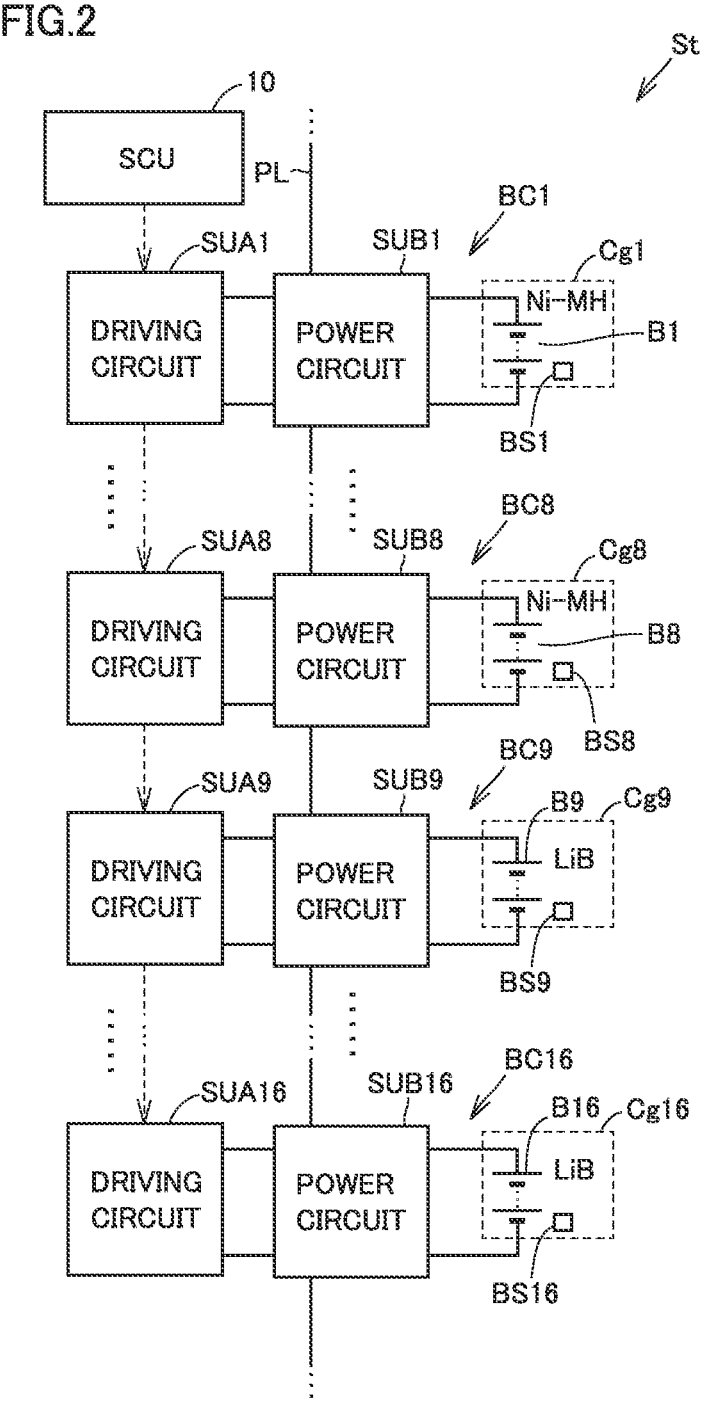
FIG. 2 is a diagram showing a configuration of a battery string shown in FIG. 1.

FIG. 2 is a diagram showing a configuration of a battery string St. Referring to FIG. 2, battery string St includes SCU (String Control Unit) 10, driving circuits SUA1 to SUA16, and battery circuits BC1 to BC16.

The SCU 10 includes a control circuit that generates a gate signal in accordance with a control command from the GCU 500. Although details will be described later, the gate signal is a signal specifying ON/OFF timing of switches included in each of the battery circuits BC1 to BC16, and corresponds to an example of the "switching signal" according to the present disclosure. In this embodiment, the SCU 10 has a processor and is configured to perform a predetermined calculation. More specifically, the SCU 10 acquires the states of the batteries included in the battery circuits BC1 to BC16 using sensor signals described later. This is not exclusive, however, and the power supply system 1 may be configured such that calculation is not performed in the SCU 10 but only in the GCU 500.

The battery circuits BC1 to BC8 includes power circuits SUB1 to SUB8 and cartridges Cg1 to Cg8. Cartridges Cg1 to Cg8 include batteries B1 to B8 and monitoring units BS1 to BS8, respectively. By connecting the power circuits SUB1 to SUB8 to the batteries B1 to B8, battery circuits BC1 to BC8 including the batteries B1 to B8 are formed, respectively. Each of the battery circuits BC1 to BC8 corresponds to an example of the "first battery circuit" according to the present disclosure. The driving circuits SUA1 to SUA8 are configured to drive switches (more specifically, SW11 and SW12, which will be described later) included in the battery circuits BC1 to BC8, respectively. The driving circuits SUA1 to SUA8 function as "first driving circuits" according to the present disclosure.

In this embodiment, each of batteries B1 to B8 is a nickel-hydrogen secondary battery (hereinafter referred to as "Ni-MH"). In this embodiment, batteries B1 to B8 are manufactured by connecting a plurality of Ni-MH used in an electrically powered vehicle in series. Each of batteries B1 to B8 in this embodiment is configured by six Ni-MH modules (used batteries) having a voltage of 6.0 to 7.2 V connected in series. The total capacity of the batteries B1 to B8 is, for example, 4 Ah. The Ni-MH constituting each of the batteries B1 to B8 corresponds to a high-output and low-capacity battery.

The battery circuits BC9 to BC16 include power circuits SUB9 to SUB16 and cartridges Cg9 to Cg16, respectively. Cartridges Cg9 to Cg16 include batteries B9 to B16 and monitoring units BS9 to BS16, respectively. By connecting the power circuits SUB9 to SUB16 to the batteries B9 to B16, the battery circuits BC9 to BC16 including the batteries B9 to B16 are formed, respectively. Each of the battery circuits BC9 to BC16 corresponds to an example of the "second battery circuit" according to the present disclosure. The driving circuits SUA9 to SUA16 are configured to drive switches (more specifically, SW11 and SW12, which will be described later) included in the battery circuits BC9 to BC16, respectively. The driving circuits SUA9 to SUA16 function as "second driving circuits" according to the present disclosure.

In this embodiment, each of batteries B9 to B16 is a lithium ion secondary battery (hereinafter, referred to as "LiB"). In this embodiment, batteries B9 to B16 are manufactured by connecting a plurality of LiB used in an electrically powered vehicle in series. Each of batteries B9 to B16 in this embodiment is configured by connecting twelve LiB cells (used batteries) having a voltage of 3.1 to 3.8 V in series. The total capacity of the batteries B9 to B16 is, for example, 50 Ah. The LiB constituting each of the batteries B9 to B16 corresponds to a low-output, high-capacity battery, and has a smaller output power and a larger capacity than Ni-MH constituting each of the batteries B1 to B8.

Hereinafter, unless they are described in a distinguished manner, each of the driving circuits SUA1 to SUA16 will be referred to as "SUA", each of the power circuits SUB1 to SUB16 will be referred to as "SUB", each of the battery circuits BC1 to BC16 will be referred to as "battery circuit BC", each of the cartridges Cg1 to Cg16 will be referred to as "Cg", each of the batteries B1 to B16 will be referred to as "battery B", and each of the monitoring units BS1 to BS16 will be referred to as "monitoring unit BS". Each battery B corresponds to a battery element (a battery constituting a battery string).

Figure 3:
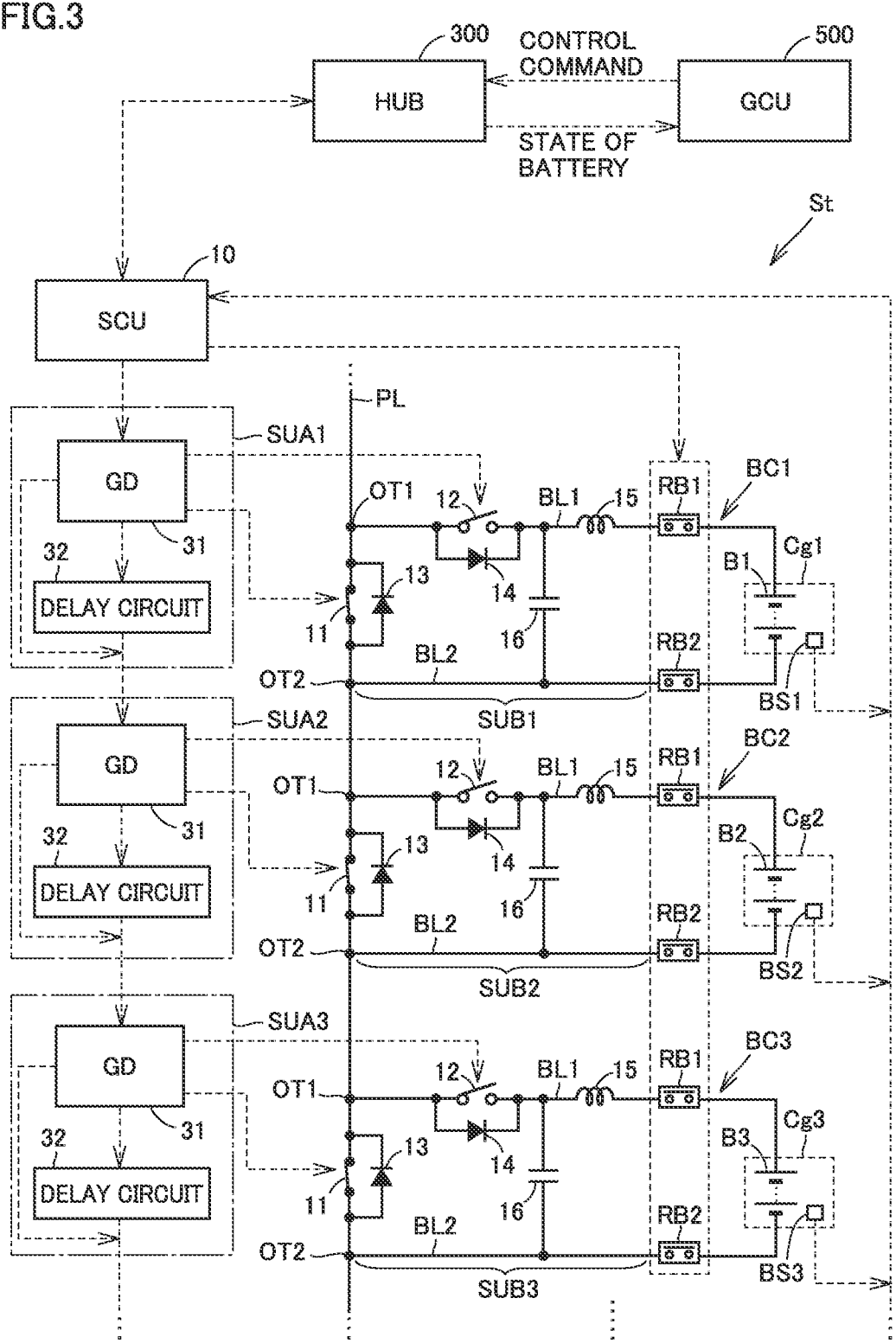
FIG. 3 is a diagram showing a configuration of a driving circuit and a battery circuit shown in FIG. 2.

FIG. 3 is a diagram showing a configuration of the driving circuit (SUA) and the battery circuit BC. Referring to FIG. 3 together with FIG. 2, the battery circuit BC includes a power circuit (SUB), a cartridge (Cg), and breakers RB1 and RB2 (hereinafter, referred to as "breaker RB" when not distinguished). The SUB and Cg are connected to each other via breakers RB1 and RB2. The SCU 10 is configured to switch the connection state (conduction/disconnection) between the SUB and the Cg by performing ON/OFF control of each circuit breaker RB in accordance with a control command from the GCU 500. The breaker RB may be an electromagnetic mechanical relay. The breaker RB may be configured to allow a user to manually turn on/off.

In this embodiment, the battery string St comprises a plurality of combinations of SUA, SUB, and breaker RB, and these combinations have the same configuration and are compatible. Therefore, the SUA, the SUB, and the breaker RB may be modularized. By modularizing common components, cost reduction due to mass production can be expected. In addition, the handling of each module becomes easy, so that a failed module can be easily replaced.

The Cg is configured to be detachable from the SUB. For example, when each of the breakers RB1 and RB2 is in an OFF state (cutoff state), the user may remove Cg from the SUB. Since the battery string St can operate even if there is an empty cartridge, the user can easily increase or decrease the number of Cg included in the battery string St. The battery string St may have an empty cartridge for retrofitting. Such a battery string St is suitable for reuse of batteries.

At Cg, the monitoring unit BS is configured to detect a state (e.g., voltage, current, and temperature) of the battery B and to output the detection result to the SCU 10. The monitoring unit BS includes a voltage sensor for detecting the voltage of the battery B, a current sensor for detecting the current of the battery B, and a temperature sensor for detecting the temperature of the battery B. The monitoring unit BS may be BMS (Battery Management System) further having, in addition to the sensor function, an SOC (State Of Charge) estimation function, an SOH (State of Health) estimation function, a battery voltage equalization function, a diagnosis function, and a communication function. The SCU 10 obtains states (e.g., temperature, current, voltage, SOC, and internal resistance) of the batteries B included in the battery circuits BC1 to BC16 based on the outputs of the monitoring units BS, and outputs the obtained states of the batteries B to the GCU 500.

The GCU 500 performs charge and discharge control of the battery string St so that the SOC of each battery B included in the battery string St does not fall below the lower limit SOC value and does not exceed the upper limit SOC value. In this embodiment, the lower limit SOC value is set to 20%, and the upper limit SOC value is set to 80%.

Therefore, each battery B included in the battery string St is charged and discharged in the range of 20 to 80% SOC (in the range of SOC used).

The battery circuits BC1 to BC16 included in the battery string St are connected by a common electric wire PL. The electric wire PL includes output terminals OT1 and OT2 of the battery circuits BC. The output terminal OT2 of the battery circuit is connected to the output terminal OT1 of the battery circuit adjacent to the battery circuit, whereby the battery circuits BC included in the battery string St are connected to each other. For example, the output terminal OT2 of the battery circuit BC1 is electrically connected to the output terminal OT1 of the battery circuit BC2 adjacent to the battery circuit BC1.

The SUB includes a first switching element 11 (hereinafter referred to as "SW11"), a second switching element 12 (hereinafter referred to as "SW12"), a first diode 13, a second diode 14, a choke coil 15, a capacitor 16, and output terminals OT1 and OT2. Each of SW11 and SW12 is driven by SUA. SW11 and SW12 according to this embodiment correspond to examples of the "first switch" and the "second switch" according to the present disclosure, respectively.

The switch SW11, the capacitor 16, and the battery B are connected in parallel between the output terminals OT1 and OT2 of the SUB. SW11 is located on the electric wire PL and is configured to switch a connection state (conduction/disconnection) between the output terminal OT1 and the output terminal OT2. The output terminal OT1 is connected to the positive electrode of the battery B via the electric wire BL1, and the output terminal OT2 is connected to the negative electrode of the battery B via the electric wire BL2. The breakers RB1 and RB2 are provided on the electric wires BL1 and BL2, respectively. The electric wire BL1 is further provided with the SW 12 and the choke coil 15. In the battery circuit BC, the voltage of the battery B is applied between the output terminals OT1 and OT2 when the SW12 connected in series with the battery B is in the ON state (connection state) and the SW11 connected in parallel with the battery B is in the OFF state (interrupted state).

A capacitor 16 connected to each of the electric wire BL1 and the electric wire BL2 is provided between the output terminals OT1 and OT2 and the battery B. One end of the capacitor 16 is connected to the electric wire BL1 between the SW 12 and the choke coil 15. The capacitor 16 smoothes the voltage of the battery B and outputs the smoothed voltage across the output terminals OT1 and OT2.

Each of SW11 and SW12 is, for example, an FET (Field Effect Transistor). The first diode 13 and the second diode 14 are connected in parallel to SW11 and SW12, respectively. The switch SW12 is located between the output terminal OT1 and the choke coil 15. The choke coil 15 is located between the SW 12 and the positive electrode of the battery B. The battery B, the choke coil 15, and the capacitor 16 form an RCL filter. The RCL filter equalizes the current. Each of SW11 and SW12 is not limited to FET, but may be a switch other than FET.

The driving circuit (SUA) is provided for each battery circuit BC. SUA includes a GD (gate driver) 31 for driving SW11 and SW12 in accordance with a gate signal, and a delay circuit 32 for delaying the gate signal. Each of SW11 and SW12 included in the battery circuit BC is controlled to be ON/OFF in accordance with a gate signal.

Figure 4:
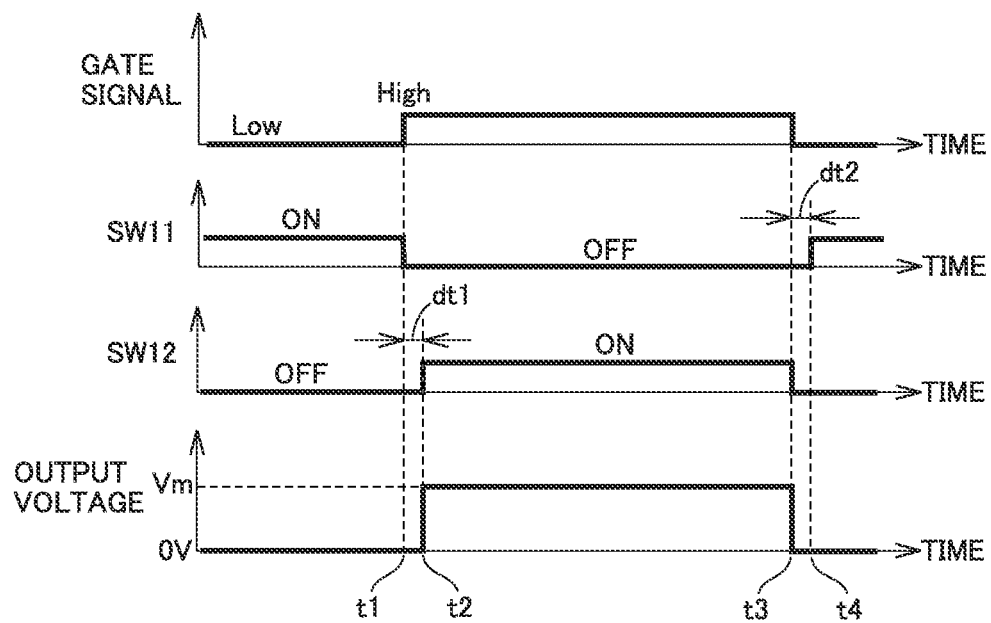
FIG. 4 is a time chart showing an example of the operation of the battery circuit controlled by the control device according to the embodiment of the present disclosure.

FIG. 4 is a time chart showing an example of the operation of the battery circuit BC controlled by the gate signal. In this embodiment, rectangular wave signals are used as gate signals for driving SW11 and SW12. "Low" and "High" of the gate signal shown in FIG. 4 mean the L level and the H level of the gate signal (rectangular wave signal), respectively. The "output voltage" means a voltage output between the output terminals OT1 and OT2.

Referring to FIG. 4 together with FIG. 3, in the initial state of battery circuit BC, no gate signal is input to SUA (gate signal=L level), and SW11 and SW12 are in the ON state and the OFF state, respectively.

When a gate signal is input to the SUA, the GD 31 drives the SW11 and the SW12 in accordance with the input gate signal. In the example shown in FIG. 4, at timing t1, the gate signal rises from the L level to the H level, and at the same time as the rise of the gate signal, the SW11 switches from the ON state to the OFF state. Then, at timing t2 delayed by a predetermined time (hereinafter referred to as "dt1") from the rise of the gate signal, the SW 12 is switched from the OFF state to the ON state. Thus, the battery circuit BC enters an operating state. Hereinafter, a period from the rise of the gate signal until the elapse of dt1 is also referred to as a "first delay period".

Figure 5:
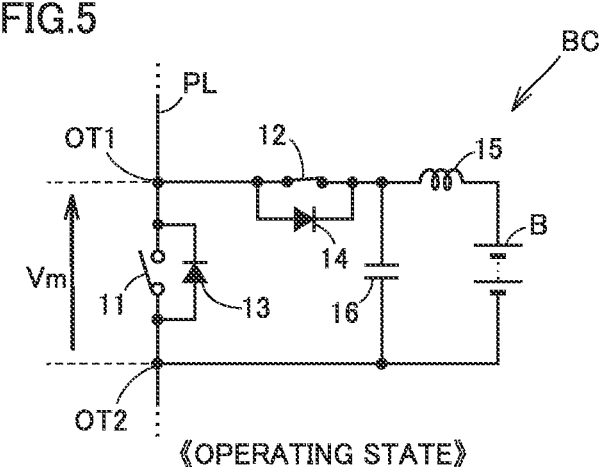
FIG. 5 is a diagram showing a battery circuit in an operating state.

FIG. 5 is a diagram showing the battery circuit BC in an operating state. Referring to FIG. 5, in battery circuit BC in the operating state, SW11 is in the OFF state and SW12 is in the ON state, whereby the voltage of battery B is applied between output terminals OT1 and OT2. When the voltage of the battery B is applied between the output terminals OT1 and OT2 via the capacitor 16, the voltage Vm is output between the output terminals OT1 and OT2. When the battery circuit BC is in an operating state, the battery B included in the battery circuit BC is connected to the power supply circuit of the power supply system 1.

Referring again to FIG. 4 together with FIG. 3, when the gate signal falls from the H level to the L level at timing t3, the SW 12 is switched from the ON state to the OFF state simultaneously with the fall of the gate signal. Thus, the battery circuit BC is brought into a stopped state. In the battery circuit BC in the stopped state, the voltage of the battery B is not applied between the output terminals OT1 and OT2 because the SW12 is turned OFF. Thereafter, at timing t4 delayed by a predetermined time (hereinafter referred to as "dt2") from the falling edge of the gate signal, the SW11 is switched from the OFF state to the ON state. The dt1 and dt2 may be the same or different from each other. In this embodiment, each of dt1 and dt2 is 100 nsec. However, each of dt1 and dt2 can be arbitrarily set.

When the battery circuit BC is in a stopped state, the battery B included in the battery circuit BC is disconnected from the power supply circuit of the power supply system 1. Hereinafter, a period from the falling edge of the gate signal until the elapse of dt2 is also referred to as a "second delay period". A period from the end of the second delay period until the battery circuit BC enters the operating state is also referred to as a "stop period".

Figure 6:
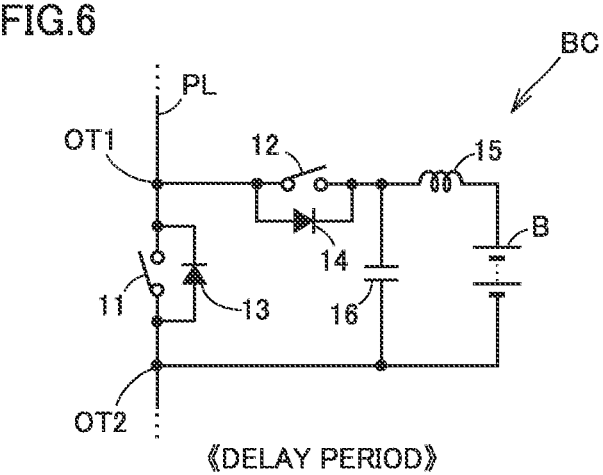
FIG. 6 is a diagram showing a state of a battery circuit in a delay period.

FIG. 6 is a diagram showing a state of the battery circuit BC in a delay period. As shown in FIG. 6, in each of the first delay period and the second delay period, both SW11 and SW12 are turned off.

Figure 7:
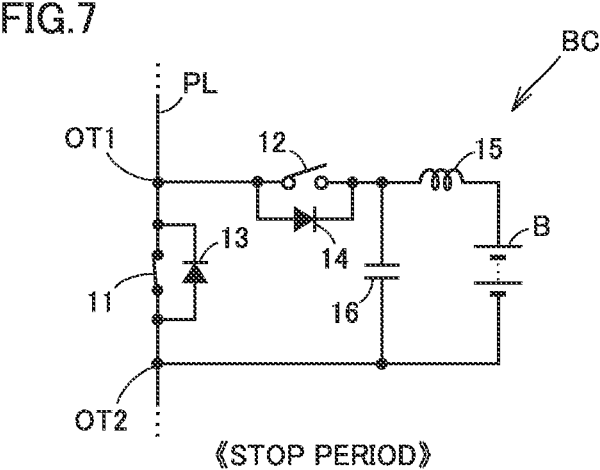
FIG. 7 is a diagram showing a state of a battery circuit during a stop period.

FIG. 7 is a diagram showing a state of the battery circuit BC during a stop period. As shown in FIG. 7, in the stop period, as in the initial state, SW11 is turned ON and SW12 is turned OFF.

During both the delay period and the stop period, the battery circuit BC is in a stopped state. In the battery circuit BC in the stopped state, no voltage is applied between the output terminals OT1 and OT2. By providing the first delay period and the second delay period, the switch SW11 and the switch SW12 are prevented from being turned ON at the same time (that is, the battery circuit BC is prevented from being short-circuited).

As described above, each of the battery circuits BC1 to BC16 includes the batteries B1 to B16 in such a manner that the battery circuits BC1 to BC16 can be connected to or disconnected from the power supply circuit of the power supply system 1, respectively. Connection/disconnection of battery B is performed by SW11 and SW12. Each battery circuit BC includes a battery B, a SW 11 connected in parallel to the battery B, and a SW 12 connected in series to the battery B. In each battery circuit BC, the battery B is disconnected from the power supply circuit when the SW 12 is in the OFF state, and the battery B is connected to the power supply circuit when the SW 11 is in the OFF state and the SW 12 is in the ON state.

Referring again to FIG. 2 and FIG. 3, in the battery string St, SUAs provided for each battery circuit BC are arranged from upstream to downstream in the signal transmission direction. The driving circuits SUA1 to SUA16 are arranged as driving circuits SUA1, SUA2, SUA3, . . . from upstream. That is, the driving circuit SUA1 is located at the most upstream side. The SCU 10 generates a gate signal in accordance with a control command from the GCU 500, and outputs the generated gate signal to the driving circuit SUA1. In this embodiment, the control command transmitted from the GCU 500 to the SCU 10 includes a command for the SCU 10 (hereinafter referred to as "SCU command") and a command for each SUA (hereinafter referred to as "SUA command"). The SCU command includes switching information indicating the timing of rising/falling of the gate signal. The switching information may specify a total period and a duty ratio of the gate signal (a ratio of the H level period to the total period) in addition to the rising/falling timing. The SUA command includes operation information specifying the battery circuit BC to be operated (that is, at least one of the battery circuits BC1 to BC16) and delay information indicating whether or not delay processing is performed in each SUA. Further, the delay information may specify a delay time in delay processing in addition to the presence or absence of delay processing. The GCU 500 can control the output of the battery string St by causing the SCU 10 to generate a desired gate signal and delay the generated gate signal to each SUA as needed. The GCU 500 may perform PWM (pulse width modulation) control using a rectangular-wave gate signal.

The SCU 10 generates a gate signal in accordance with a control command (SCU command) from the GCU 500, and transmits a SUA command together with the generated gate signal to the driving circuit SUA1. The gate signal is transmitted from the most upstream driving circuit SUA1 to the downstream side. A gate signal and a SUA command are input to each SUA. Hereinafter, the operation of each SUA will be described.

The GD 31 of each SUA determines whether or not the battery circuit BC corresponding to the SUA is an operation target based on the SUA command (operation information). When the battery circuit BC corresponding to the SUA is to be operated, the GD 31 drives the SW11 and SW12 of the battery circuit BC according to the gate signal before transmitting the input gate signal and the SUA command to the downstream side. The GD 31 operates the battery circuit BC at the operation timing indicated by the gate signal (e.g., timing t2 shown in FIG. 4), and stops the battery circuit BC at the stop timing indicated by the gate signal (e.g., timing t3 shown in FIG. 4).

The GD 31 of each SUA determines the presence or absence of delay processing on the gate signal based on the SUA command (delay information). When the delay information indicates "there is delay processing", the GD 31 outputs the gate signal to the delay circuit 32. The delay circuit 32 generates a gate signal by delaying the input gate signal for a predetermined time (hereinafter referred to as "SUA delay time"), and outputs the generated gate signal to the downstream SUA. The SUA delay time is, for example, a fixed value. However, the SUA delay time may be set in accordance with the SUA command (delay information) from the GCU 500. When the delay information indicates "no delay processing", the GD 31 outputs a gate signal directly to the downstream SUA without passing through the delay circuit 32. Therefore, the delay processing by the delay circuit 32 is not performed.

When the battery circuit BC corresponding to the SUA is not to be operated, the GD 31 passes the input gate signal and the SUA command (pass-through). In this case, the gate signal is transmitted to the downstream SUA without switching in the battery circuit BC. Therefore, the battery circuit BC is in a stopped state. The most downstream SUA (the driving circuit SUA 16 in this embodiment) may transmit a gate signal to the SCU 10 instead of the downstream SUA. The SCU 10 can recognize that the gate signal has been transmitted to the most downstream by receiving the gate signal from the most downstream SUA.

Figure 8:
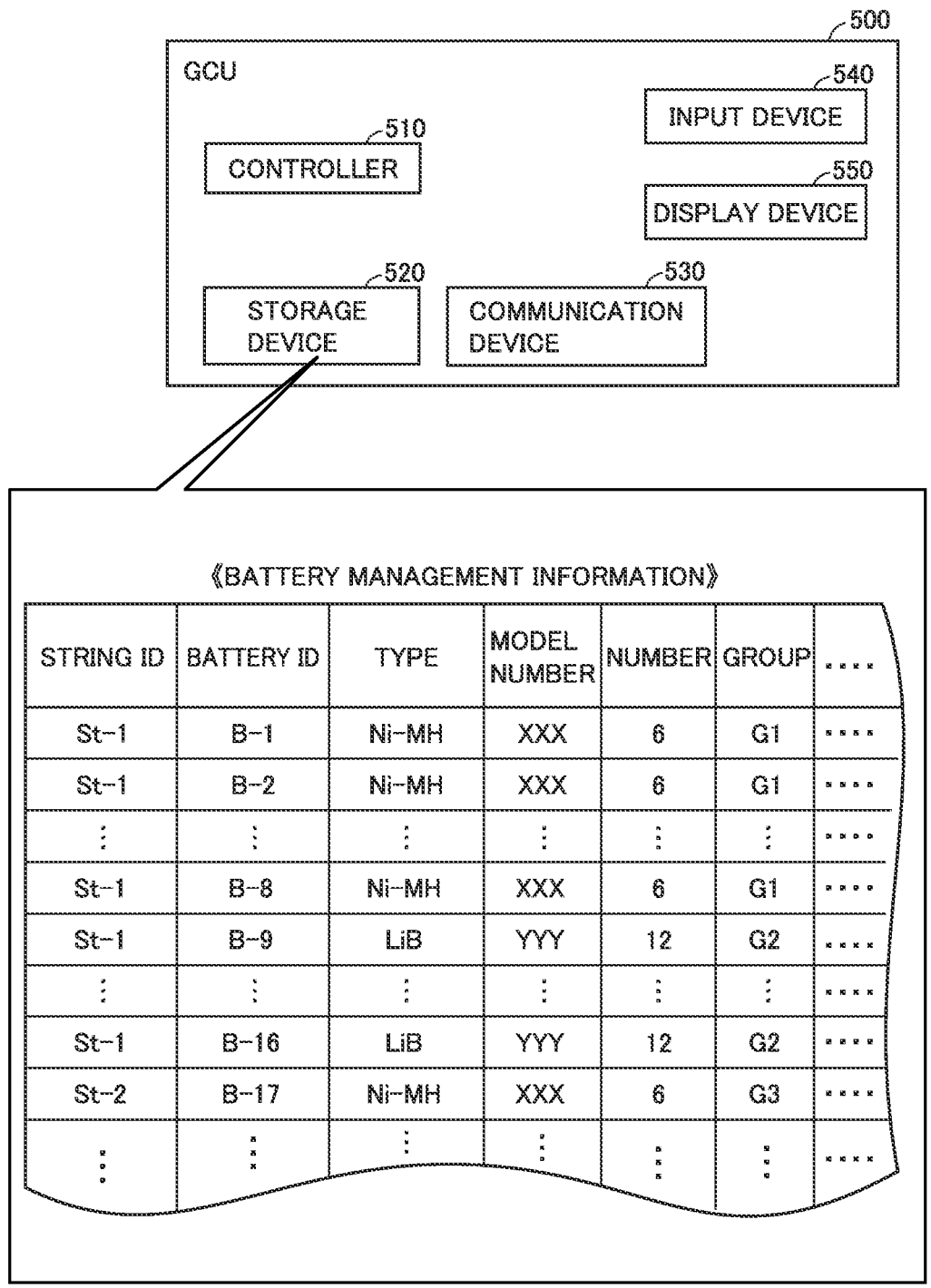
FIG. 8 is a diagram showing a configuration of a control device according to an embodiment of the present disclosure.

FIG. 8 is a diagram showing a configuration of the GCU 500. Referring to FIG. 8 together with FIGS. 1 to 3, the GCU 500 is configured to integrally control a plurality of battery strings St included in the power supply system 1. The number of battery strings St included in the power supply system 1 may be 5 to 10. The number of battery strings included in the power supply system is arbitrary, and may be 2 to 4, or 100 or more.

The GCU 500 includes a controller 510, a storage device 520, a communication device 530, an input device 540, and a display device 550. The controller 510 may be a computer. The controller 510 includes a processor such as a CPU (Central Processing Unit) and a RAM (Random Access Memory) for temporarily storing data to be processed by the processor. The storage device 520 is configured to be able to store the stored information. The storage device 520 stores, for example, a program executed by the processor and information (e.g., map, mathematical expression, and various parameters) used in the program. The communication device 530 includes various communication I/Fs (interfaces). Controller 510 is configured to communicate with the outside of GCU 500 through communication device 530. In this embodiment, various processes in the GCU 500 are executed by the controller 510 executing a program stored in the storage device 520. However, various processes in the GCU 500 are not limited to execution by software, and may be executed by dedicated hardware (electronic circuit).

The input device 540 is a device that accepts an input from a user. The input device 540 outputs a signal corresponding to an input from the user to the controller 510. For example, the user may input a predetermined instruction or request to the controller 510 or may set a value of a parameter to the controller 510 through the input device 540. Examples of the input device 540 include various switches (such as a push button switch and a slide switch), various pointing devices (such as a mouse and a touch pad), a keyboard, and a touch panel. The input device 540 may also include a smart speaker for receiving audio input.

The display device 550 is configured to display information input from the controller 510. The controller 510 can notify the user of information via the display device 550. Examples of the display device 550 include a CRT (Cathode Ray Tube) display, a liquid crystal display (LCD), and a touch panel display. The display device 550 may have a speaker function.

The GCU 500 manages information on each registered battery B while distinguishing by the battery ID (identification information for identifying the battery B). Specifically, battery management information as shown in FIG. 8 is stored in the storage device 520. The controller 510 may display the battery management information on the display device 550. The user can register the battery B in the GCU 500 or update the battery management information through the input device 540. When the battery B is registered in the GCU 500, a battery ID is assigned to the battery B, and information related to the battery B is added to the battery management information in a state of being linked to the battery ID. The GCU 500 manages each battery B using the battery management information.

The battery management information indicates a string ID, a battery ID, a type, a model number, the number, and a group for each registered battery B. The string ID of the battery management information indicates the battery string St to which the battery B belongs. For example, "St-1" and "St-2" in FIG. 8 indicate that the battery B specified by the battery ID belongs to the battery strings St1 and St2, respectively. The type, model number, and number of the battery management information indicate the type, model number, and number of the secondary battery (module/cell) constituting the battery B, respectively. In this embodiment, the type of battery is either a nickel-hydrogen battery (Ni-MH) or a lithium-ion battery (LiB). The model number of a battery indicates the structure (e.g., size, shape, and material) and capacity of the battery. The same model number means that the battery structure, capacity, and manufacturing conditions are approximately the same. For example, the battery B specified by the battery ID "B-1" includes six Ni-MH modules of model number "XXX".

The group of battery management information indicates a group to which the battery B belongs. When the battery B is registered in the GCU 500, the GCU 500 distributes the battery B to any group based on the type of the battery. For example, with respect to the battery string St1, Ni-MH is allocated to the group G1, and LiB is allocated to the group G2. The GCU 500 classifies each battery B included in the battery string St1 into a first battery and a second battery based on the battery management information. In the battery string St1, each of the batteries B1 to B8 belonging to the group G1 corresponds to a first battery, and each of the batteries B9 to B16 belonging to the group G2 corresponds to a second battery. The information for distinguishing the batteries B is not limited to the battery management information shown in FIG. 8. For example, the battery management information may not indicate a model number. The battery management information may indicate not only a model number but also a battery manufacturer.

When the GCU 500 generates the control command described above, the GCU 500 determines whether or not each group is to be operated. Thus, the GCU 500 can perform charge control and discharge control of the battery strings St for each group. In this embodiment, the operation target indicated by the control command for the battery string St1 is any one of the group G1 alone, the group G2 alone, and the groups G1 and G2. However, when the GCU 500 detects the failure of the battery B, the GCU 500 excludes the failed battery B from the operation target.

Hereinafter, with reference to FIGS. 1 to 3, a case where the operation target indicated by the control command (operation information) for the battery string St1 is only the group G1, a case where the operation target is only the group G2, and a case where the operation target is both the groups G1 and G2 will be described. The GCU 500 instructs each SUA of the battery string St1 to be operated using the SUA command (operation information).

The battery circuits BC1 to BC8 includes batteries B1 to B8 (Ni-MH) belonging to the group G1, respectively. When the SUA command transmitted from the GCU 500 to the most upstream driving circuit SUA1 indicates that only the group G1 (battery circuits BC1 to BC8) is to be operated, the GD 31 of the driving circuit SUA1 sets the battery circuit BC1 to the operating state at the operating timing indicated by the gate signal received from the GCU 500. Thereafter, the driving circuit SUA1 transmits the gate signal and the SUA command to the downstream driving circuit SUA2 with or without performing delay processing on the gate signal in accordance with the SUA command (delay information) received from the GCU 500. Further, the GD 31 of the driving circuit SUA1 sets the battery circuit BC1 in the operating state to the stopped state at the stop timing indicated by the gate signal received from the GCU 500.

The GD 31 of the driving circuits SUA2 to SUA8 located downstream of the driving circuit SUA1 respectively puts the battery circuits BC2 to BC8 into the operating state at the operating timing indicated by the gate signal received from the upstream SUA. Further, each of the driving circuits SUA2 to SUA8 transmits the gate signal and the SUA command to the downstream SUA with or without performing delay processing on the gate signal in accordance with the SUA command (delay information) received from the upstream SUA. Further, each GD 31 of the driving circuits SUA2 to SUA8 sets the battery circuit BC in the operating state to the stopped state at the stop timing indicated by the gate signal received from the upstream SUA.

The GD 31 of each of the driving circuits SUA9 to SUA16 located downstream of the driving circuit SUA8, to the downstream SUA, passes through the gate signal and the SUA command received from the upstream SUA. Thus, each of the battery circuits BC9 to BC16 is maintained in the stopped state. Thus, when only the group G1 is the target of operation indicated by the control command for the battery string St1, only the Ni-MH (first battery) among the batteries B included in the battery string St1 is connected to the power supply circuit of the power supply system 1. Hereinafter, such a connection state is also referred to as "Ni connection state". By controlling the PCS 200 in the Ni connection state, the GCU 500 can cause each Ni-MH connected to the power supply circuit to discharge (hereinafter also referred to as "Ni output"), charge each Ni-MH connected to the power supply circuit (hereinafter also referred to as "Ni input"), and alternately repeat charging and discharging of each Ni-MH connected to the power supply circuit (hereinafter also referred to as "Ni charging and discharging"). In the Ni output, each Ni-MH included in the battery string St outputs power to the power supply circuit of the power supply system 1. At the Ni input, each Ni-MH included in the battery string St is charged by the power supplied from the power grid PG to the power supply circuit of the power supply system 1. Ni charging and discharging may be continuous pulse charging and discharging.

The battery circuits BC9 to BC16 include batteries B9 to B16 (LiB) belonging to the group G2, respectively. When the SUA command transmitted from the GCU 500 to the most upstream driving circuit SUA1 indicates that only the group G2 (battery circuits BC9 to BC16) is to be operated, the GD 31 of each of the driving circuits SUA1 to SUA8, to the downstream SUA, passes through the gate signal and the SUA command received from the GCU 500. Thus, each of the battery circuits BC1 to BC8 is maintained in a stopped state. The GD 31 of the driving circuits SUA9 to SUA16 located downstream of the driving circuit SUA8 respectively puts the battery circuits BC9 to BC16 into the operating state at the operating timing indicated by the gate signal received from the upstream SUA. Each of the driving circuits SUA9 to SUA16 transmits the gate signal and the SUA command to the downstream SUA with or without performing delay processing on the gate signal in accordance with the SUA command (delay information) received from the upstream SUA. Further, each of the GDs 31 of the driving circuits SUA9 to SUA16 sets the battery circuit BC in the operating state to the stop state at the stop timing indicated by the gate signal received from the upstream SUA.

As described above, when the operation target indicated by the control command for the battery string St1 is only the group G2, only LiB (second battery) of the batteries B included in the battery string St1 is connected to the power supply circuit of the power supply system 1. Hereinafter, such a connection state is also referred to as a "Li connection state". By controlling the PCS 200 in the Li connection state, the GCU 500 can cause each LiB connected to the power supply circuit to discharge (hereinafter also referred to as "Li output"), charge each LiB connected to the power supply circuit (hereinafter also referred to as "Li input"), and alternately repeat charging and discharging each LiB connected to the power supply circuit (hereinafter also referred to as "Li charging and discharging"). In the Li output, each LiB included in the battery string St outputs power to the power supply circuit of the power supply system 1. At the Li input, each LiB included in the battery string St is charged by the power supplied from the power grid PG to the power supply circuit of the power supply system 1. The Li charging and discharging may be continuous pulse charging and discharging.

When the SUA command transmitted from the GCU 500 to the most upstream driving circuit SUA1 indicates that both the groups G1 and G2 (battery circuits BC1 to BC16) are to be operated, the GD 31 of the driving circuits SUA1 to SUA16 respectively puts the battery circuits BC1 to BC16 into operation states at the operation timing indicated by the input gate signals. Each of the GDs 31 of the driving circuits SUA1 to SUA16 transmits the gate signal and the SUA command to the downstream SUA with or without performing delay processing on the gate signal in accordance with the inputted SUA command (delay information). Further, the GD 31 of each of the driving circuits SUA1 to SUA16 sets the battery circuit BC in the operating state to the stopped state at the stop timing indicated by the input gate signal.

As described above, when the operation target indicated by the control command for the battery string St1 is both the groups G1 and G2, both Ni-MH and LiB included in the battery string St1 are connected to the power supply circuit of the power supply system 1. Hereinafter, such a connection state is also referred to as "Ni&Li connection state". By controlling the PCS 200 in the Ni&Li connection state, the GCU 500 can cause each Ni-MH and each LiB connected to the power supply circuit to discharge (hereinafter also referred to as "Ni&Li output"), charge each Ni-MH and each LiB connected to the power supply circuit (hereinafter also referred to as "Ni&Li input"), and alternately repeat charging and discharging each Ni-MH and each LiB connected to the power supply circuit (hereinafter also referred to as "Ni&Li charging and discharging"). In the Ni&Li output, each Ni-MH and each LiB included in the battery string St outputs power to the power supply circuit of the power supply system 1. At the Ni&Li input, each Ni-MH and each LiB included in the battery string St are charged by the power supplied from the power grid PG to the power supply circuit of the power supply system 1. The Ni&Li charging and discharging may be continuous pulse charging and discharging.

The driving circuit SUA16 located most downstream in the battery string St outputs a gate signal to, for example, the SCU 10. This is not exclusive, however, and the driving circuit SUA16 may stop the transmission of the gate signal. Further, the GCU 500 may transmit a gate signal indicating both the operation timing and the stop timing to the driving circuit SUA1, or may transmit a gate signal indicating the stop timing to the driving circuit SUA1 after transmitting a gate signal indicating the operation timing.

Figure 9:
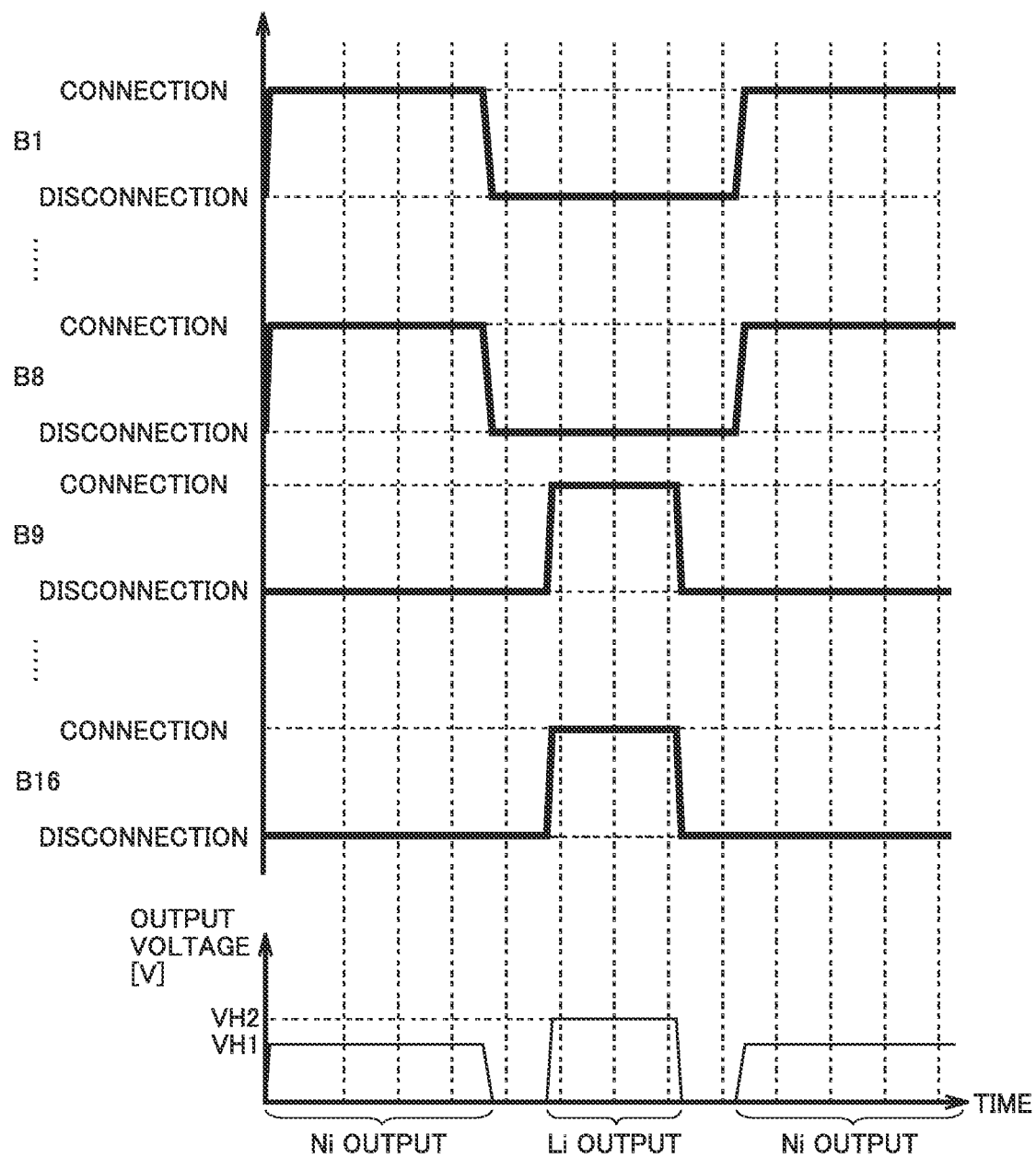
FIG. 9 is a diagram showing an operation example of a battery string for executing Ni output and Li output without delay processing by each SUA.

FIG. 9 is a diagram showing an operation example of a battery string St for executing Ni output and Li output without delay processing by each SUA. FIG. 9 shows the states (connection/disconnection) of the batteries B1 to B16 and the output voltage of the battery string St.

Referring to FIGS. 2 and 3 and FIG. 9, the Ni output by the battery string St is executed when the battery string St is in the Ni connection state. In the Ni connection state, each of the batteries B1 to B8 is connected to the power supply circuit, and each of the batteries B9 to B16 is disconnected from the power supply circuit. In the Ni output, power (voltage: VH1 in FIG. 9) is output from the battery string St in the Ni connected state. On the other hand, the Li output by the battery string St is executed when the battery string St is in the Li connection state. In the Li-connected state, each of the batteries B9 to B16 is connected to the power supply circuit, and each of the batteries B1 to B8 is disconnected from the power supply circuit. At the Li output, power (voltage VH2 in FIG. 9) is output from the battery string St in the Li-connected state.

The GCU 500 may perform PWM control on the output of the battery string St by adjusting the duty ratio of the gate signal. Further, when each SUA in the battery string St transmits the gate signal to the downstream side, delay processing may be performed by the delay circuit 32.

Figure 10:
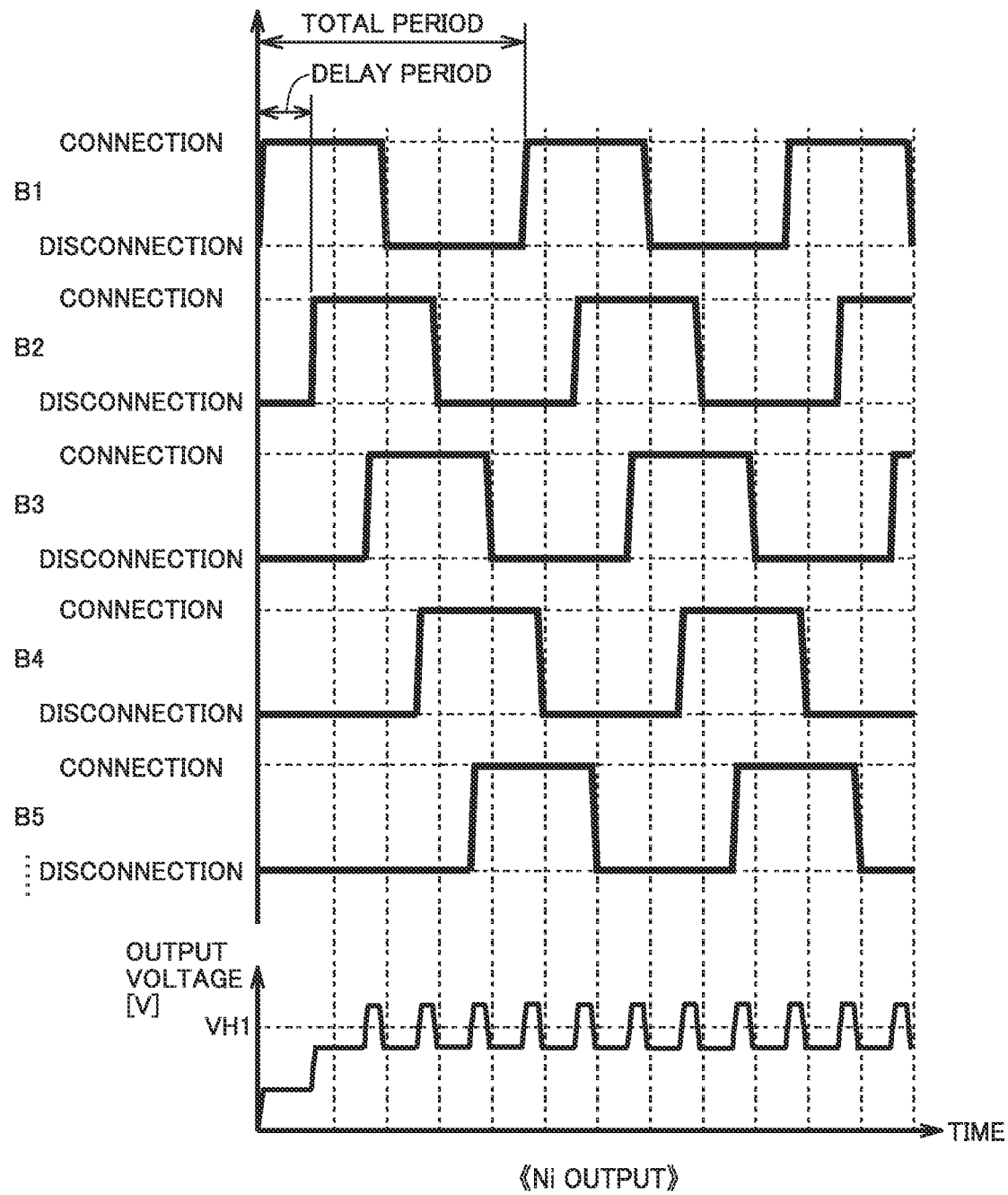
FIG. 10 is a diagram showing an operation example of a battery string for executing Ni output under the condition of delay processing.

FIG. 10 is a diagram showing an operation example of the battery string St for executing Ni output under the condition with delay processing. In this example, the GCU 500 transmits an SCU command to the SCU 10 indicating the initial rise timing, period, and duty ratio of the gate signal. The SCU 10 generates a gate signal having a first rise timing, a period, and a duty ratio specified by the SCU command. Further, the GCU 500 transmits a SUA command indicating "with delay processing" to the SCU 10. The delay time is, for example, a fixed value. In the example shown in FIG. 10, the duty ratio of the gate signal is 50%. FIG. 10 shows the states (connection/disconnection) of the batteries B1 to B5 and the output voltage of the battery string St. The states (connection/disconnection) of the batteries B1 to B5 are switched according to the rising/falling of the gate signal.

Referring to FIG. 10 together with FIG. 2 and FIG. 3, in this operation method, when a gate signal is transmitted to each of the driving circuits SUA1 to SUA8, the delay circuit 32 of each of the SUAs delays the gate signal. Therefore, the batteries B2 to B8 are sequentially connected to the power supply circuit at predetermined delay times after the first battery B1 is connected to the power supply circuit. Each Ni-MH connected to the power supply circuit is disconnected from the power supply circuit after a predetermined time (time specified by the gate signal) has elapsed. The batteries B1 to B8 (Ni-MH) are sequentially connected to and disconnected from the power supply circuit. In the operation method (sweeping method) shown in FIG. 10, a predetermined number of Ni-MHs are always connected to the power supply circuit while the Ni-MHs connected to the power supply circuit are switched. On the other hand, the batteries B9 to B16 (LiB) are always disconnected from the power supply circuit. That is, the battery string St enters the Ni connection state. Then, electric power (voltage: VH1 in FIG. 10) is output from the battery string St in the Ni-connected state. By sequentially operating a plurality of Ni-MHs in the sweeping method, the current and SOC of each Ni-MH included in the battery string St can be equalized.

Figure 11:
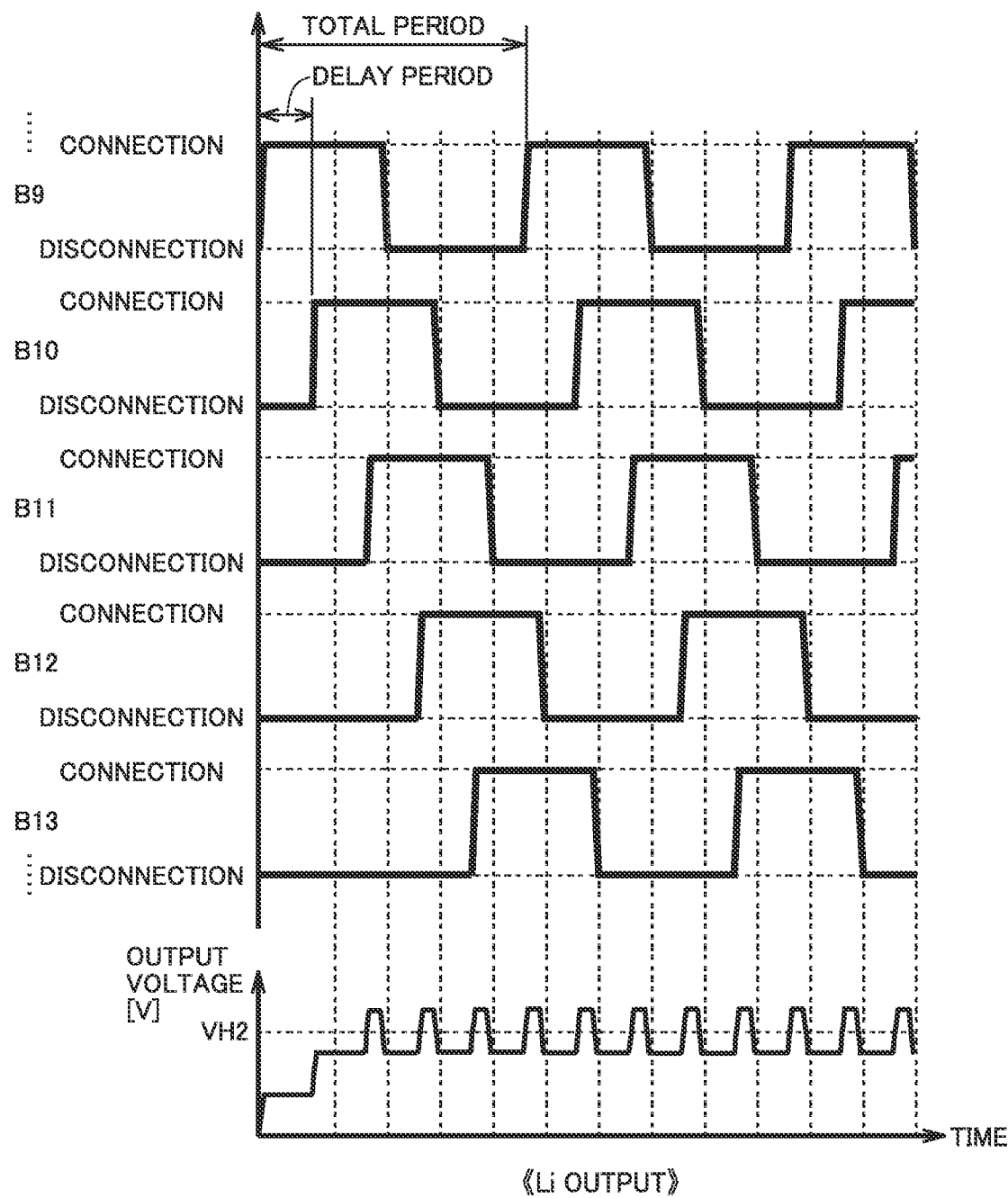
FIG. 11 is a diagram showing an operation example of a battery string for executing Li output under the condition of delay processing.

FIG. 11 is a diagram showing an operation example of the battery string St for executing Li output under the condition with delay processing. In this example, Li output is executed in a sweeping method. The control method is substantially the same as the sweeping method of Ni output shown in FIG. 10. In the example shown in FIG. 11, the duty ratio of the gate signal is 50%. FIG. 11 shows the states (connection/disconnection) of the batteries B9 to B13 and the output voltage of the battery string St. The states (connection/disconnection) of the batteries B9 to B13 are switched according to the rising/falling of the gate signal.

Referring to FIG. 11 together with FIG. 2 and FIG. 3, in this operation method, when a gate signal is transmitted to the driving circuits SUA9 to SUA16, the delay circuit 32 of each SUA delays the gate signal. Therefore, the batteries B10 to B16 are sequentially connected to the power supply circuit at predetermined delay times after the first battery B9 is connected to the power supply circuit. Further, each LiB connected to the power supply circuit is disconnected from the power supply circuit after a predetermined time (time specified by the gate signal) has elapsed. The batteries B9 to B16 (LiB) are sequentially connected to and disconnected from the power supply circuit. In the operation method (sweeping method) shown in FIG. 11, a predetermined number of LiBs are always connected to the power supply circuit while the LiBs connected to the power supply circuit are switched. On the other hand, the batteries B1 to B8 (Ni-MH) are always disconnected from the power supply circuit. That is, the battery string St is in the Li-connected state. Then, electric power (voltage: VH2 in FIG. 11) is output from the battery string St in the Li-connected state. By sequentially operating a plurality of LiBs in the sweeping method, the current and SOC of each LiB included in the battery string St can be equalized.

Figure 12:
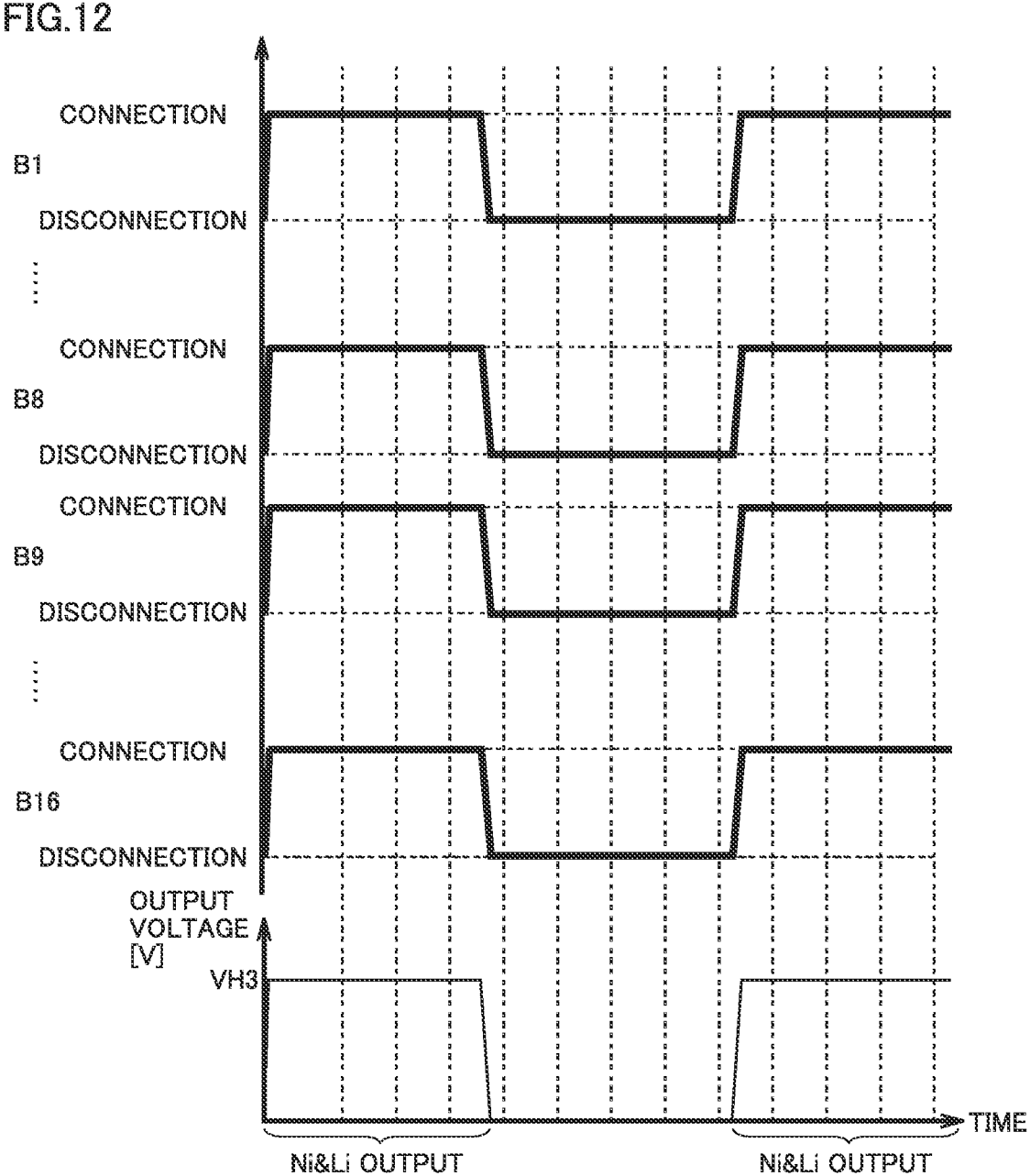
FIG. 12 is a diagram showing an operation example of a battery string for executing Ni&Li output.

FIG. 12 is a diagram showing an operation example of a battery string St for executing Ni&Li output. FIG. 12 shows the states (connection/disconnection) of the batteries B1 to B16 and the output voltage of the battery string St.

Referring to FIG. 12 together with FIGS. 2 and 3, the Ni&Li output by the battery string St is executed when the battery string St is in the Ni&Li connection state. In the Ni&Li connection state, each of the batteries B1 to B16 is connected to a power supply circuit. In the Ni&Li output, power (voltage: VH3 in FIG. 12) is output from the battery string St in the Ni&Li connected state.

Figure 13:
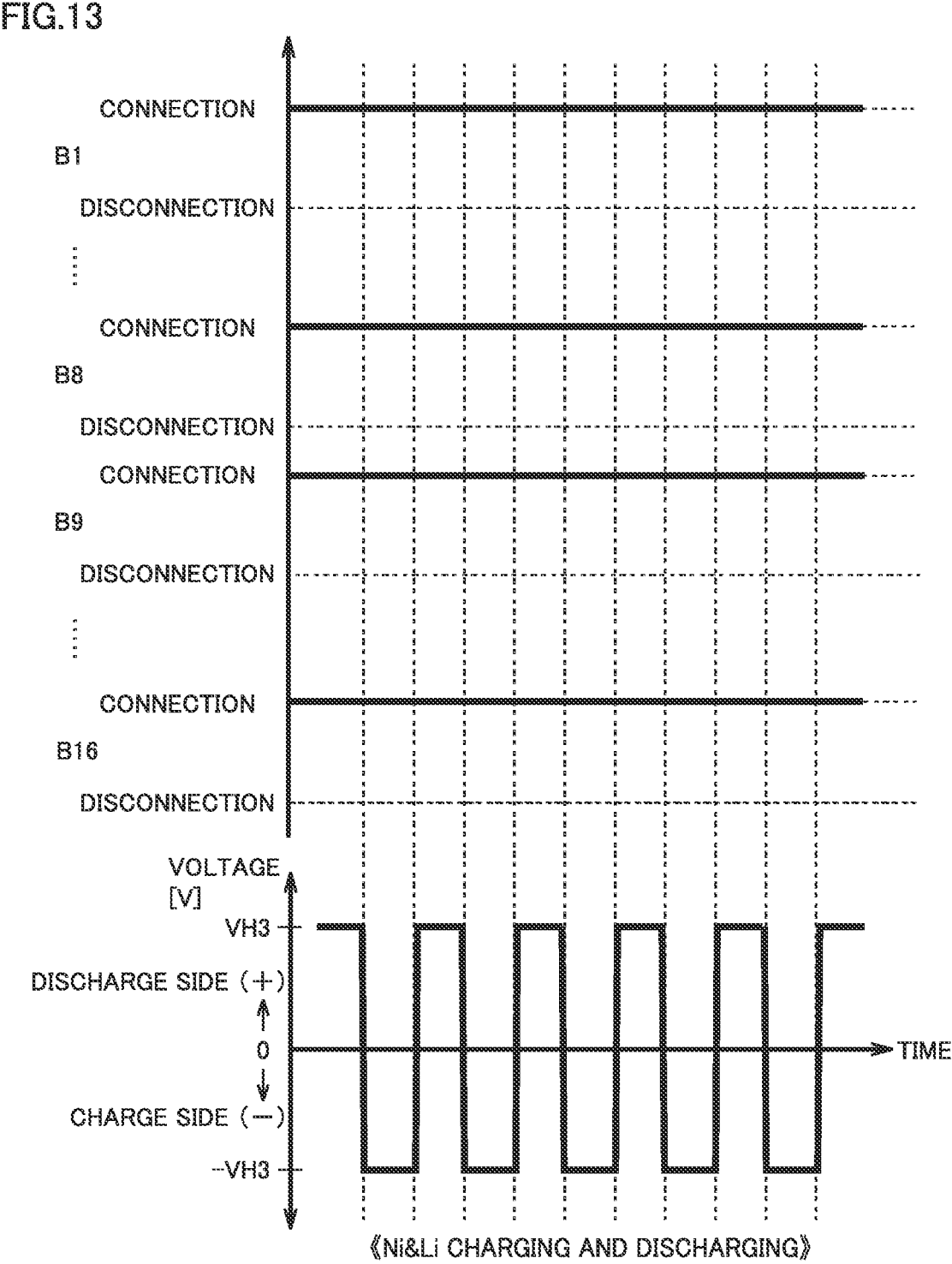
FIG. 13 is a diagram showing an operation example of a battery string for executing Ni&Li charging and discharging.

FIG. 13 is a diagram showing an operation example of a battery string St for executing Ni&Li charging and discharging. FIG. 13 shows the states (connection/disconnection) of the batteries B1 to B16 and the voltages of the battery strings St (with the discharge side being positive and the charge side being negative).

Referring to FIGS. 2 and 3 and FIG. 13, Ni&Li charging and discharging by the battery string St is executed when the battery string St is in the Ni&Li connection state. In the Ni&Li connection state, each of the batteries B1 to B16 is connected to a power supply circuit. In Ni&Li charging and discharging, Ni&Li discharging and Ni&Li charging are repeated at a predetermined cycle. In Ni&Li discharging, electric power (voltage: VH3 in FIG. 13) is output from the battery string St in the Ni&Li connection state. In Ni&Li charging, electric power (voltage: −VH3 in FIG. 13) is input to the battery string St in the Ni&Li connection state. In Ni&Li charging and discharging, the amount of electric power output from the battery string St in one Ni&Li discharge is the same as the amount of electric power input to the battery string St in one Ni&Li charge. Therefore, even if the battery string St executes Ni&Li charging and discharging, the amount of electricity stored in the battery string St (More specifically, SOC of each Ni-MH and each LiB included in the battery string St) is not reduced.

When the GCU 500 is requested from the server 700 to adjust power of the power grid PG, the GCU 500 controls each battery string St and the power supply circuit (e.g., each breaker R and the PCS 200) so as to adjust the power of the power grid PG by the input power and output power of the power supply circuit. GCU 500 may control PCS 200 and each battery string St to execute one selected from the group consisting of Ni output, Ni input, Ni charging and discharging, Li output, Li input, Li charging and discharging, Ni&Li output, Ni&Li input, and Ni&Li charging and discharging.

Figure 14:
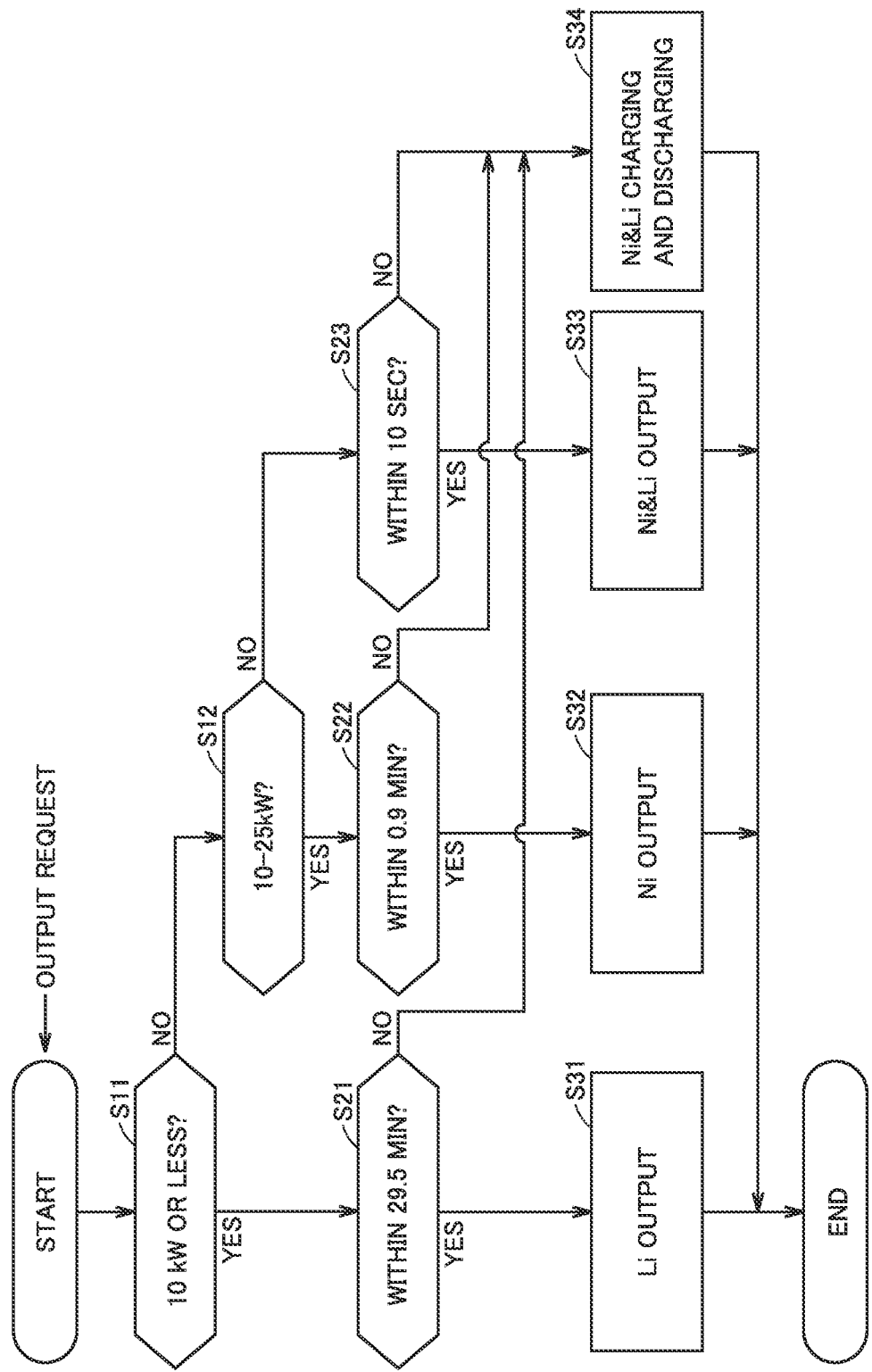
FIG. 14 is a flowchart showing a process executed when the control device according to the embodiment of the present disclosure receives a power output request.

FIG. 14 is a flowchart showing an example of processing executed by the GCU 500 when power output is requested from the server 700. In this example, the degree of power adjustment and the adjustment time are transmitted from the server 700 to the GCU 500. The server 700 specifies, as the degree of power adjustment, the magnitude of the adjustment power in the range of greater than 0 kW and less than or equal to 40 kW. In a state where at least one battery string St is connected to the power supply circuit of the power supply system 1 and the power supply circuit and the power grid PG are connected (parallel on), the GCU 500 controls at least one battery string St (e.g., battery string St1) so as to respond to a request from the server 700. When the GCU 500 is requested to output power from the server 700, the GCU 500 executes a process shown in FIG. 14 described below. Hereinafter, each step in the flowchart is simply referred to as "S".

Referring to FIG. 14 together with FIGS. 1 to 3, in S11, the GCU 500 determines whether or not the required adjustment power is 10 kW or less, and if the determination result is YES, the GCU 500 determines in S21 whether or not the required adjustment time is within 29.5 minutes. When the GCU 500 determines YES in both S11 and S21, in S31, the GCU 500 causes the battery string St1 to execute Li output in a sweeping method simultaneously connecting half of the LiBs to the power supply circuit with a gate signal of a duty ratio of 50%. Thus, the GCU 500 acquires the adjustment power and the adjustment time requested from the server 700, and causes the battery string St1 to execute the above-described Li output when the adjustment power is equal to or less than the predetermined first power and the adjustment time is within the predetermined first time. The first time is set according to the discharge duration of the Li output at the first power in the battery string St1. In this embodiment, the first power is 10 kW, and the first time is 29.5 minutes.

Figure 15:
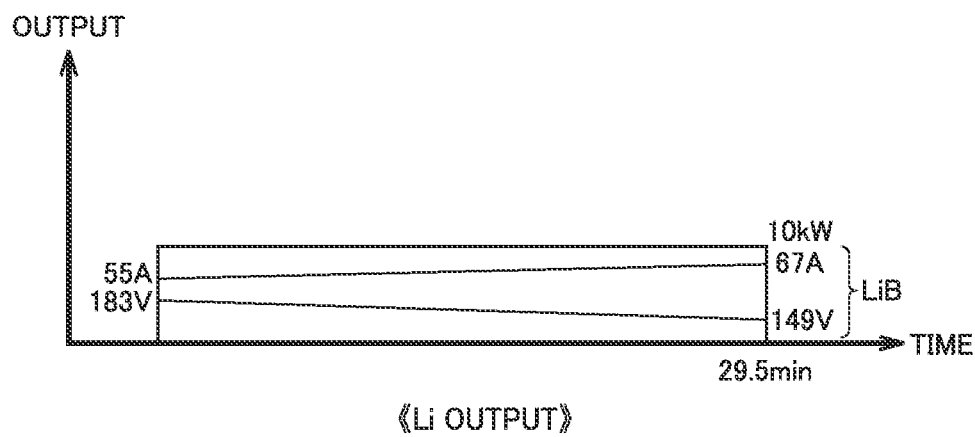
FIG. 15 is a diagram for explaining the magnitude of the power and the discharge duration of the Li output in the battery string.

FIG. 15 is a diagram for explaining the magnitude of the power and the discharge duration of the Li output in the battery string St1. Referring to FIG. 15, the discharge duration of the 10 kW Li output in battery string St1 is 29.5 minutes. The battery string St1 can continuously output electric power of 10 kW for 29.5 minutes while varying the electric current from electric power (current: L level) of 55 A current and 183 V voltage to electric power (current: H level) of 67 A current and 149 V voltage. In this embodiment, the total capacity of LiB included in the battery string St1 is 50 Ah. Each LiB is charged and discharged in the SOC range of 20 to 80%. Therefore, the substantial capacity of LiB is 30 Ah (=50 Ah×0.6). The discharge duration is calculated from an expression such as "30×2×60/(55+67)=29.5". The GCU 500 may generate a control command for the battery string St1 so that the power of the Li output of the battery string St1 becomes a target value (e.g., 10 kW).

Referring again to FIGS. 1 to 3 and FIG. 14, if NO is determined in S11, the GCU 500 determines in S12 whether or not the required adjustment power is 25 kW or less, and if the determination result is YES, the GCU 500 determines in S22 whether or not the required adjustment time is within 0.9 minutes. When it is determined YES in both S12 and S22, in S32, the GCU 500 causes the battery string St1 to execute Ni output in a sweeping method simultaneously connecting half of the Ni-MHs to the power supply circuit with a gate signal having a duty ratio of 50%. Thus, the GCU 500 acquires the adjustment power and the adjustment time requested from the server 700, and causes the battery string St1 to execute the above-described Ni output when the adjustment power is greater than the first power and equal to or less than the predetermined second power and the adjustment time is within the predetermined second time. The second time is set according to the discharge duration of the Ni output at the second power in the battery string St1. In this embodiment, the second power is 25 kW, and the second time is 0.9 minutes.

Figure 16:
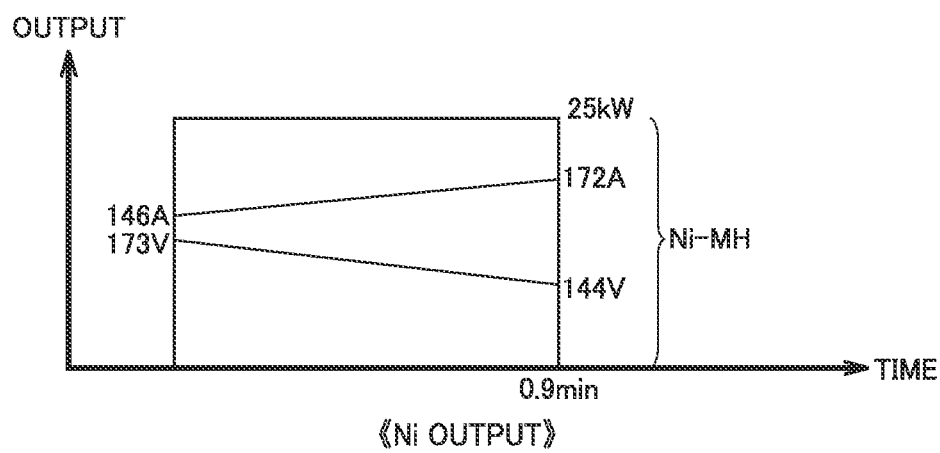
FIG. 16 is a diagram for explaining a magnitude of power and a discharge duration of a Ni output in a battery string.

FIG. 16 is a diagram for explaining the magnitude of the power and the discharge duration of the Ni output in the battery string St1. Referring to FIG. 16, the discharge duration of the 25 kW Ni output in battery string St1 is 0.9 min. The battery string St1 can continuously output power of 25 kW for 0.9 minutes while varying the current from the power (current: L level) of the current 146A and the voltage 173V to the power (current: H level) of the current 172A and the voltage 144V. The voltage of the Ni output is set to be approximately equal to the voltage of the Li output. In this embodiment, the total capacity of the Ni output included in the battery string St1 is 4 Ah. Each Ni-MH is charged and discharged in the SOC range of 20 to 80%. Therefore, the substantial capacity of Ni-MH is 2.4 Ah (=4 Ah×0.6). The discharge duration is calculated from an expression such as "2.4×2×60/(146+172)=0.9". The GCU 500 may generate a control command for the battery string St1 so that the power of the Ni output of the battery string St1 becomes a target value (e.g., 25 kW).

The discharge duration of the battery string St increases as the output power decreases. For example, when the magnitude of the power of the Ni output in the battery string St1 is changed from 25 kW to 15 kW, the discharge duration of the Ni output in the battery string St1 becomes 1.5 minutes. The discharge duration of the battery string St increases as the number of cartridges (Cg) included in the battery string St increases to increase the output voltage. For example, when the number of Ni-MH cartridges is increased from 8 to 16 in the battery string St1, the discharge duration of the Ni output (25 kW) in the battery string St1 is 1.8 minutes.

Referring again to FIGS. 1 to 3 and FIG. 14, if NO is determined in S12, the GCU 500 determines whether or not the requested adjustment time is within 10 seconds in S23. NO determination in S12 means that the required adjustment power is greater than 25 kW and less than or equal to 40 kW. When YES is determined in S23, in S33, the GCU 500 causes the battery string St1 to execute Ni&Li output in a sweeping method in which half Ni-MH and half LiB are simultaneously connected to the power supply circuit with a gate signal having a duty ratio of 50%. Thus, the GCU 500 acquires the adjustment power and the adjustment time requested from the server 700, and causes the battery string St1 to execute the above-described Ni&Li output when the adjustment power is greater than the second power and less than or equal to the predetermined third power and the adjustment time is within the predetermined third time. The third time is set according to the discharge duration of the Ni&Li output at the third power in the battery string St1. In this embodiment, the third power is 40 kW, and the third time is 10 seconds. Although the calculation formula is omitted, the discharge duration of the 40 kW Ni&Li output in the battery string St1 is 10 seconds.

If NO is determined in any one of S21 to S23, in S34, the GCU 500 causes the battery string St1 to execute Ni&Li charging and discharging in the sweeping method in which half Ni-MH and half LiB are simultaneously connected to the power supply circuit with the gate signal having a duty ratio of 50%. Thus, when the adjustment time requested by the server 700 exceeds the allowable range of the battery string St1, the GCU 500 does not output the requested power but adjusts the frequency of the power grid PG by Ni&Li charging and discharging.

Figure 17:
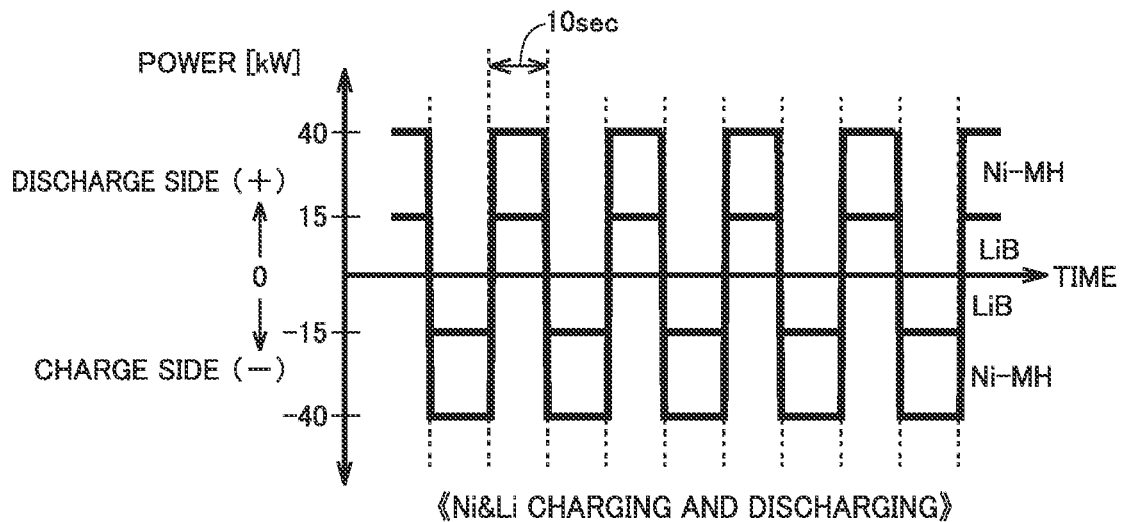
FIG. 17 is a diagram showing an example of Ni&Li charging and discharging executed in the process shown in FIG. 14.

FIG. 17 is a diagram showing an example of Ni&Li charging and discharging executed in S34 of FIG. 14. Referring to FIG. 17, battery string St1 executes continuous pulse charging and discharging, for example, at a duty ratio of 50% and a period of 20 seconds. Thus, the 40 kW discharge for 10 seconds and the 40 kW charge for 10 seconds are alternately repeated. When LiB is charged and discharged at 15 kW and Ni-MH is charged and discharged at 25 kW, a total of 40 kW is charged and discharged.

When the GCU 500 is requested to output power from the server 700, the GCU 500 adjusts the power of the power grid PG by the process shown in FIG. 14. For example, the GCU 500 may supply power from the power supply circuit of the power supply system 1 to the house (supply target) in order to reduce the power consumption of the power grid PG. The GCU 500 may compensate for the temporary power shortage of the power grid PG with the power of the battery string St. The GCU 500 may supply power from the battery string St to the house (the supply target) when the power grid PG stops powering. The GCU 500 may adjust the frequency of the power supplied to the house (supply target) by controlling the charging and discharging of the battery string St.

As described above, the power supply system 1 according to this embodiment includes a power supply circuit connectable to a plurality of battery strings St, and a GCU 500 (control device) that controls each battery string St (see FIG. 1). The battery string St includes battery circuits BC1 to BC16 connected to each other (see FIG. 2). The battery circuits BC1 to BC16 include batteries B1 to B16 in a manner that can be connected to and disconnected from the power supply circuit of the power supply system 1, respectively (see FIG. 3). The GCU 500 distinguishes the batteries B1 to B16 included in the battery string St into a first battery (group G1) and a second battery (group G2) (see FIG. 8). When the predetermined first condition is satisfied, the GCU 500 connects only the first battery (at least one of the batteries B1 to B8) among the batteries B1 to B16 included in the battery string St to the power supply circuit of the power supply system 1 and executes Ni output. In this embodiment, the first battery is a nickel-hydrogen battery. In the process shown in FIG. 14, if NO is determined in S11 and YES is determined in both S12 and S22, the first condition is satisfied. When the first condition is satisfied, the GCU 500 transmits a first control command specifying the battery circuits BC1 to BC8 as the operation targets to the battery string St. Upon receipt of the first control command, the battery string St drives SW11 and SW12 of the battery circuits BC1 to BC8 to connect the batteries B1 to B8 included in the battery circuits BC1 to BC8 to the power supply circuit of the power supply system 1, respectively. More specifically, the driving circuit SUA1 drives the switches SW11 and SW12 of the battery circuit BC1 using the gate signal (first switching signal) generated by the SCU 10 (control circuit) in accordance with the first control command from the GCU 500.

The driving circuits SUA2 to SUA8 drive the switches SW11 and SW12 of the battery circuits BC2 to BC8, for example, using gate signals obtained by delaying gate signals (first switching signals) generated by the SCU 10, respectively.

When the predetermined second condition is satisfied, the GCU 500 connects only the second battery (at least one of the batteries B9 to B16) among the batteries B1 to B16 included in the battery string St to the power supply circuit of the power supply system 1 and executes Li output. In this embodiment, the second battery is a lithium ion battery. In the process shown in FIG. 14, if a YES determination is made in both S11 and S21, the second condition is satisfied. When the second condition is satisfied, the GCU 500 transmits a second control command specifying the battery circuits BC9 to BC16 as the operation target to the battery string St. Upon receipt of the second control command, the battery string St drives SW11 and SW12 of the battery circuits BC9 to BC16 to connect the batteries B9 to B16 included in the battery circuits BC9 to BC16 to the power supply circuit of the power supply system 1, respectively. More specifically, the driving circuit SUA9 drives SW11 and SW12 of the battery circuit BC9 using the gate signal (second switching signal) generated by the SCU 10 (control circuit) in accordance with the second control command from the GCU 500. The driving circuits SUA10 to SUA16 drive the switches SW11 and SW12 of the battery circuits BC10 to BC16, for example, using gate signals obtained by delaying gate signals (second switching signals) generated by the SCU 10, respectively.

Further, when the predetermined third condition is satisfied, the GCU 500 connects both the first battery and the second battery (Both at least one of batteries B1-B8 and at least one of batteries B9-B16) included in the battery string St to the power supply circuit of the power supply system 1 and executes Ni&Li output. In the process shown in FIG. 14, if NO is determined in both S11 and S12 and YES is determined in S23, the third condition is satisfied. When the predetermined fourth condition is satisfied, the GCU 500 connects both the first battery and the second battery included in the battery string St to the power supply circuit of the power supply system 1 and executes Ni&Li charging and discharging. In the process shown in FIG. 14, when none of the first to third conditions are satisfied, the fourth condition is satisfied. The first to fourth conditions are alternatively satisfied. In the process shown in FIG. 14, the GCU 500 determines success/failure of each of the first condition, the second condition, the third condition, and the fourth condition using the required degree of power adjustment (for example, the amount of power) and the adjustment time (the required time duration for power adjustment). Therefore, the power supply system 1 can appropriately adjust power in response to a request from the server 700.

The operation method of the battery string St1 in S31 to S34 of FIG. 4 is not limited to the sweeping method, and may be the operation method shown in FIGS. 9, 12, and 13. The first to third powers and the first to third time periods may be variable. For example, the first to third time periods may be variable according to the SOC range of use of the battery string St.

In the above-described embodiment, a case has been mentioned where the GCU 500 requests the output of power from the server 700, but the GCU 500 may control each battery string St and each power supply circuit (e.g., each breaker R and PCS 200) so as to respond to the request from the server 700 when the GCU 500 requests the input of power from the server 700. The GCU 500 may store the excess power of the power grid PG in the battery string St, for example, by executing one selected from the group consisting of Ni input, Li input, and Ni&Li input.

In the above embodiment, the plurality of battery strings St included in the power supply system 1 have the same configuration. For example, the power supply system may include a battery string St1, a battery string St2 having a capacity higher than that of the battery string St1, and a battery string St3 having a power higher than that of the battery string St1. The GCU 500 may execute the process shown in FIG. 18 described below instead of the process shown in FIG. 14.

Figure 18:
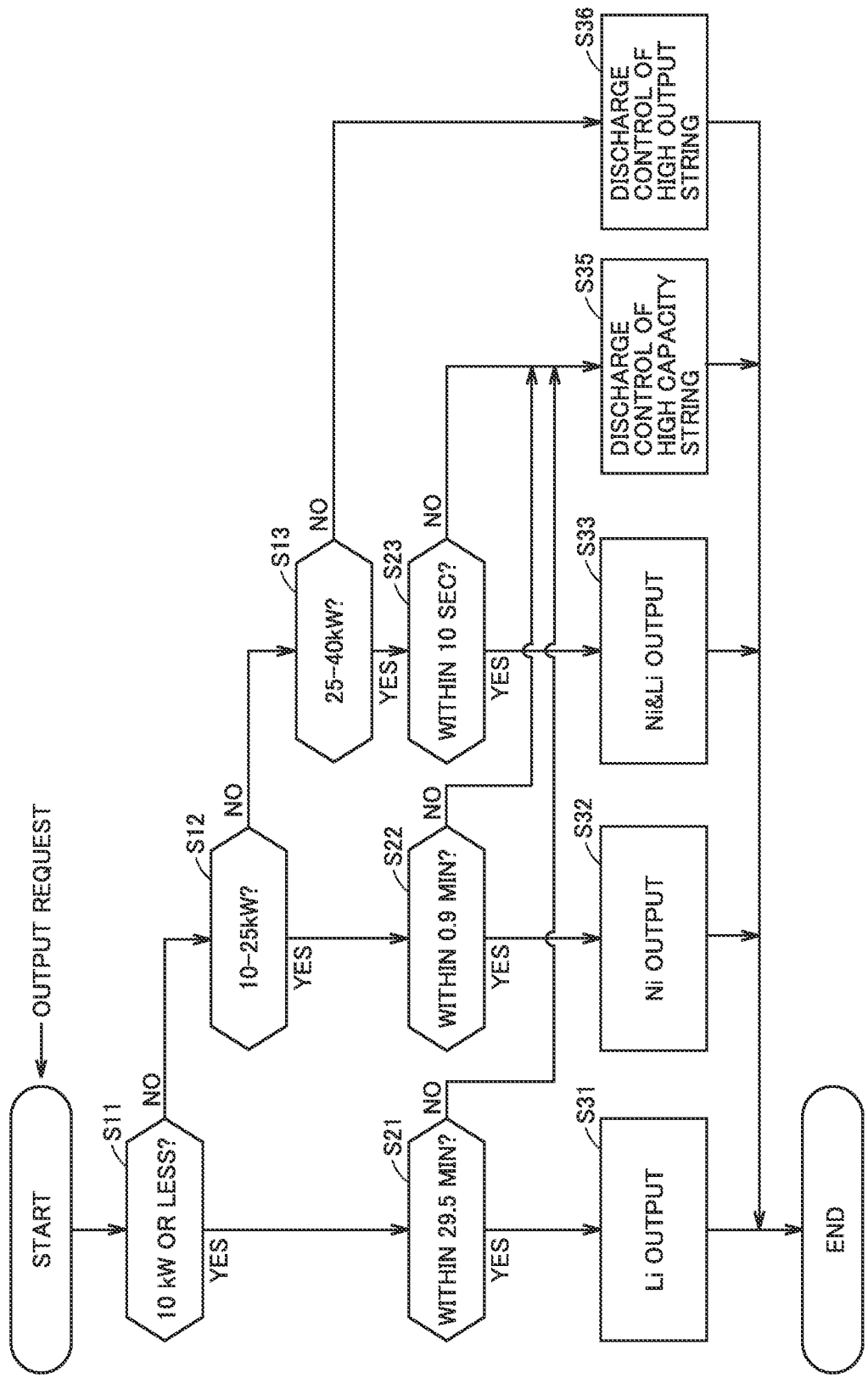
FIG. 18 is a flowchart showing a first modified example of the process shown in FIG. 14.

FIG. 18 is a flowchart showing a first modified example of the process shown in FIG. 14. The process shown in FIG. 18 is the same as the process shown in FIG. 14 except that S13 is added to the process shown in FIG. 14 and S35 and S36 are employed instead of S34 (FIG. 14). Hereinafter, S13, S35, and S36 will be described.

Referring to FIG. 18 together with FIGS. 1 to 3, in this modified example, there is no limitation on the adjustment power required by the server 700 to the GCU 500, and adjustment power exceeding 40 kW may be required to the GCU 500.

If NO is determined in S12, the GCU 500 determines in S13 whether or not the required adjustment power is 40 kW or less, and if the determination result is YES, the GCU 500 determines in S23 whether or not the required adjustment time is within 10 seconds. When the GCU 500 determines YES in both S13 and S23, the GCU 500 causes the battery string St1 to execute Ni&Li output in S33. If NO is determined in any of S21 to S23, the GCU 500 performs discharge control of the high capacity battery string St2 in S35 so as to respond to the request from the server 700. NO determination in any of S21 to S23 means that the required adjustment time exceeds the allowable range of the battery string St1. If NO is determined in S13, the GCU 500 performs discharge control of the high-output battery string St3 in S36 so as to respond to the request from the server 700. NO determination in S13 means that the required adjustment power exceeds the allowable range of the battery string St1.

When the GCU 500 is requested to adjust the frequency from the server 700, the GCU 500 may execute the process shown in FIG. 19 described below.

Figure 19:
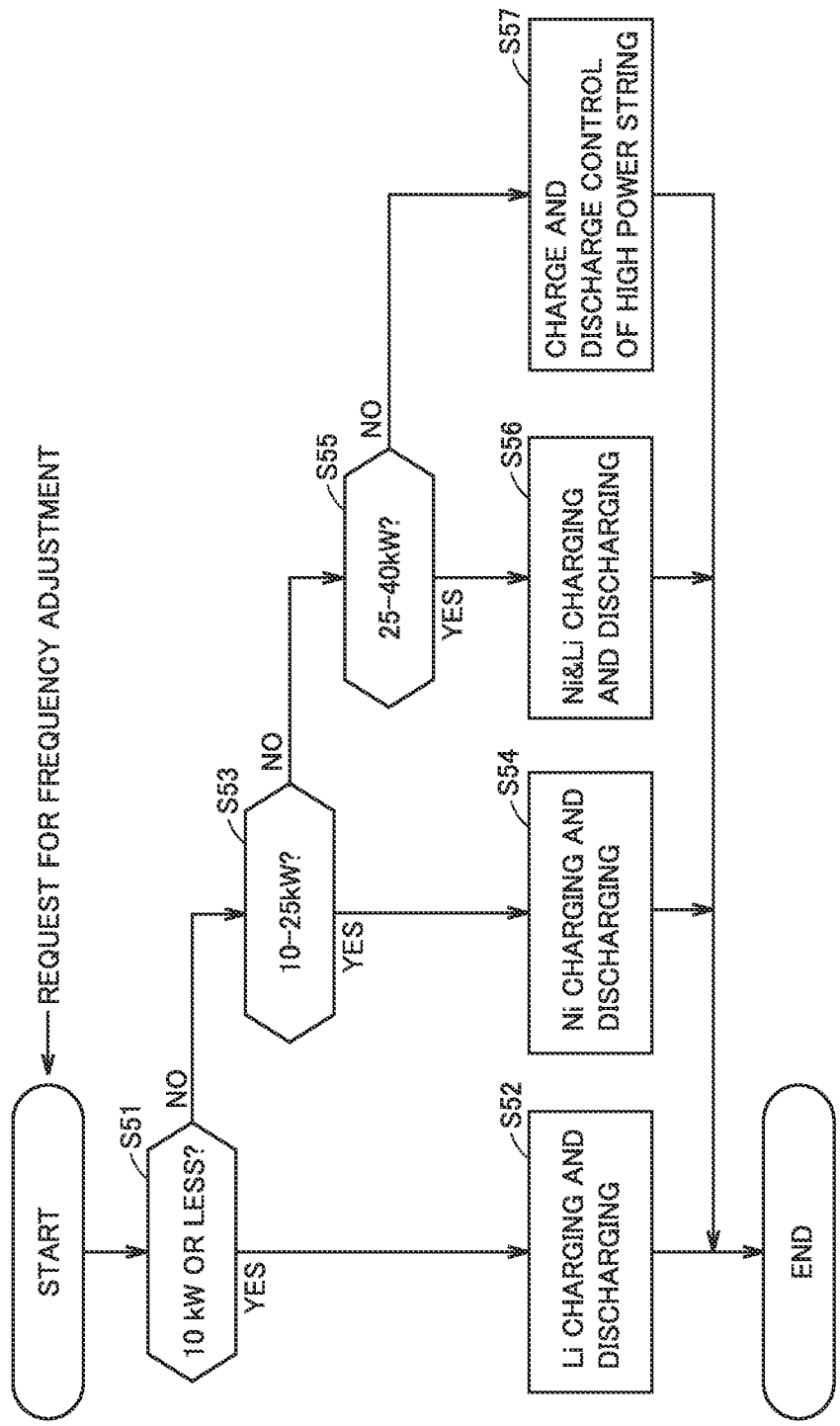
FIG. 19 is a flowchart showing a process related to frequency adjustment in a second modified example of the process shown in FIG. 14.

FIG. 19 is a flowchart showing a process related to frequency adjustment in a second modified example of the process shown in FIG. 14. Referring to FIG. 19 together with FIGS. 1 to 3, in this modified example, the GCU 500 determines whether or not the required adjustment power is 10 kW or less in S51. When YES is determined in S51, the GCU 500 causes the battery string St1 to execute Li charging and discharging in S52. If NO is determined in S51, the GCU 500 determines whether or not the required adjustment power is 25 kW or less in S53. When YES is determined in S53, the GCU 500 causes the battery string St1 to execute Ni charging and discharging in S54. If NO is determined in S53, the GCU 500 determines whether or not the required adjustment power is 40 kW or less in S55. When YES is determined in S55, the GCU 500 causes the battery string St1 to execute Ni&Li charging and discharging in S56. On the other hand, if NO is determined in S55, the GCU 500 executes charge and discharge control of the high-output battery string St3 in S57 so as to respond to the request from the server 700.

The first modified example and the second modified example may be implemented in combination. According to the power supply system of each of the above-described modifications, it is possible to perform power adjustment over a wider range.

The GCU 500 may determine whether each of the first condition and the second condition is satisfied based only on the required power level.

Figure 20:
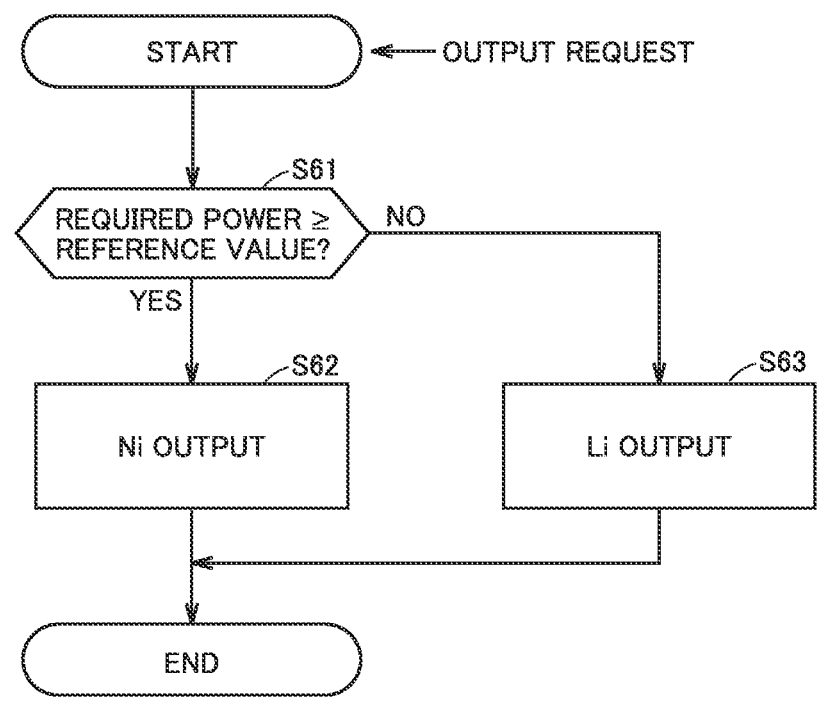
FIG. 20 is a flowchart showing a third modified example of the process shown in FIG. 14.

FIG. 20 is a flowchart showing a third modified example of the process shown in FIG. 14. Referring to FIG. 20 together with FIGS. 1 to 3, in this modified example, the GCU 500 determines whether the requested output power is equal to or greater than a predetermined reference value in S61. If YES is determined in S61, the GCU 500 causes the battery string St1 to execute Ni output in S62. If NO is determined in S61, the GCU 500 causes the battery string St1 to execute the Li output in S63. In a power supply system mounted on a mobile body (e.g., a vehicle), the GCU 500 may execute the process shown in FIG. 20. In such a mobile body, a high-output Ni output is executed when instantaneous power is required for movement.

Figure 21:
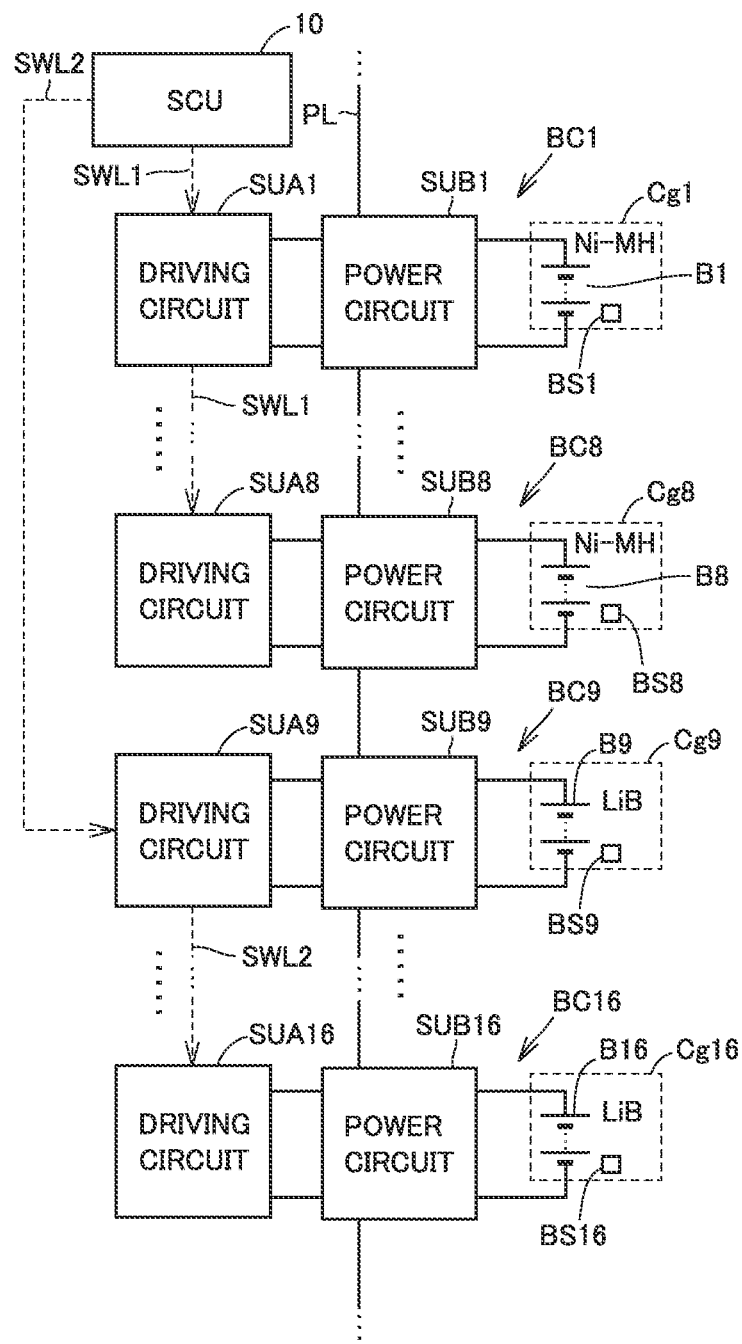
FIG. 21 is a diagram showing a modified example of the configuration shown in FIG. 2.

In the above-described embodiment, the driving circuit of the battery circuit which is not to be operated passes through the switching signal (gate signal). This is not exclusive, however, signal lines of the switching signal may be provided for each battery type. FIG. 21 is a diagram showing a modified example of the configuration shown in FIG. 2. Referring to FIG. 21, a battery string according to this modified example includes a signal line SWL1 transmitting a switching signal (gate signal) to driving circuits SUA1 to SUA8, and a signal line SWL2 transmitting a switching signal (gate signal) to driving circuits SUA9 to SUA16. The SCU 10 transmits the gate signal (first switching signal) generated in accordance with the first control command from the GCU 500 to the signal line SWL1. In this case, the driving circuit SUA1 receives the gate signal (first switching signal) generated by the SCU 10. The SCU 10 transmits the gate signal (second switching signal) generated in accordance with the second control command from the GCU 500 to the signal line SWL2. In this case, the driving circuit SUA9 receives the gate signal (second switching signal) generated by the SCU 10. With this configuration, the pass-through function of the GD 31 can be omitted.

The first battery and the second battery are not limited to the nickel-hydrogen battery and the lithium-ion battery described above. The first battery and the second battery may be two types of batteries whose voltages are greatly different from each other. In the above-described embodiment, the GCU 500 distinguishes the plurality of batteries B included in the battery string St by two sections (the first battery/the second battery), but the plurality of batteries B may be distinguished by three or more sections. For example, the first battery may be a nickel-hydrogen battery, the second battery may be a lithium ion battery, the third battery may be a lead-acid battery, and the fourth battery may be a lithium-air battery. The GCU 500 may classify the plurality of batteries B included in the battery string St into one of the first to fourth batteries. Further, the GCU 500 may differentiate a plurality of batteries B included in the battery string St by the capacity of the batteries. For example, the first battery may have a low capacity, the second battery may have a medium capacity, and the third battery may have a high capacity.

In some embodiments, the power supply system may not include a plurality of battery strings, and the number of battery strings may be one.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power supply system comprising:
a power supply circuit;
a battery string connectable to the power supply circuit; and
a control device that controls the battery string, wherein:
the battery string includes a plurality of battery circuits connected to each other,
each of the plurality of battery circuits includes a battery in such a manner that the battery is connectable to and disconnectable from the power supply circuit,
the control device classifies a plurality of batteries included in the battery string into at least a first battery and a second battery,
when a predetermined first condition is satisfied, the control device connects, to the power supply circuit, only the first battery among the batteries included in the battery string,
when a predetermined second condition is satisfied, the control device connects, to the power supply circuit, only the second battery among the batteries included in the battery string;
each of the plurality of battery circuits includes the battery, a first switch connected in parallel to the battery, and a second switch connected in series to the battery,
when the second switch is in an OFF state, the battery is disconnected from the power supply circuit,
when the first switch is in the OFF state and the second switch is in an ON state, the battery is connected to the power supply circuit;
the plurality of battery circuits included in the battery string include:
a plurality of first battery circuits each including a battery classified as the first battery; and
a plurality of second battery circuits each including a battery classified as the second battery,
when the first condition is satisfied, the control device transmits a first control command to the battery string,
when the second condition is satisfied, the control device transmits a second control command to the battery string,
when the battery string receives the first control command, the battery string drives the first switch and the second switch of each of the first battery circuits in such a manner that respective batteries included in the first battery circuits are connected to the power supply circuit, and
when the battery string receives the second control command, the battery string drives the first switch and the second switch of each of the second battery circuits in such a manner that respective batteries included in the second battery circuits are connected to the power supply circuit.

2. The power supply system according to claim 1, wherein the battery string further includes:
a control circuit that generates a switching signal in accordance with a control command from the control device;
a first driving circuit that drives the first switch and the second switch of each of the plurality of first battery circuits, using a first switching signal generated by the control circuit in accordance with the first control command from the control device, or using a switching signal that is delayed relative to the first switching signal; and
a second driving circuit that drives the first switch and the second switch of each of the plurality of second battery circuits, using a second switching signal generated by the control circuit in accordance with the second control command from the control device, or using a switching signal that is delayed relative to the second switching signal.

3. The power supply system according to claim 1, wherein the first battery is a nickel-metal hydride battery, and the second battery is a lithium-ion battery.

4. The power supply system according to claim 1, wherein the second battery is smaller in output power and larger in capacity than the first battery.

5. A power supply system comprising:
a power supply circuit;
a battery string connectable to the power supply circuit; and
a control device that controls the battery string, wherein:
the battery string includes a plurality of battery circuits connected to each other,
each of the plurality of battery circuits includes a battery in such a manner that the battery is connectable to and disconnectable from the power supply circuit,
the control device classifies a plurality of batteries included in the battery string into at least a first battery and a second battery,
when a predetermined first condition is satisfied, the control device connects, to the power supply circuit, only the first battery among the batteries included in the battery string,
when a predetermined second condition is satisfied, the control device connects, to the power supply circuit, only the second battery among the batteries included in the battery string,
when the first condition is satisfied, the control device causes each battery connected to the power supply circuit to be discharged, while keeping connecting, to the power supply circuit, only the first battery among the batteries included in the battery string,
when the second condition is satisfied, the control device causes each battery connected to the power supply circuit to be discharged, while keeping connecting, to the power supply circuit, only the second battery among the batteries included in the battery string,
when a predetermined third condition is satisfied, the control device causes each battery connected to the power supply circuit to be discharged, while keeping connecting both the first battery and the second battery to the power supply circuit, when a predetermined fourth condition is satisfied, the control device causes each battery connected to the power supply circuit to be charged and discharged repeatedly, while keeping connecting at least one of the first battery and the second battery to the power supply circuit, the power supply circuit is electrically connectable to an external power supply, the control device controls the power supply circuit in such a manner that causes the power supply circuit to adjust electric power of the external power supply, using input and output power of the power supply circuit, and the control device determines, based on a required degree of power adjustment and a required time duration for power adjustment, whether or not each of the first condition, the second condition, the third condition, and the fourth condition is satisfied.

6. A control device that controls a battery string connectable to a power supply circuit, wherein the battery string includes a plurality of battery circuits connected to each other, each of the plurality of battery circuits includes a battery in such a manner that the battery is connectable to and disconnectable from the power supply circuit, the control device classifies a plurality of batteries included in the battery string into at least a first battery and a second battery, when a predetermined first condition is satisfied, the control device connects, to the power supply circuit, only the first battery among the batteries included in the battery string, and when a predetermined second condition is satisfied, the control device connects, to the power supply circuit, only the second battery among the batteries included in the battery string, each of the plurality of battery circuits includes the battery, a first switch connected in parallel to the battery, and a second switch connected in series to the battery, when the second switch is in an OFF state, the battery is disconnected from the power supply circuit, when the first switch is in the OFF state and the second switch is in an ON state, the battery is connected to the power supply circuit;

the plurality of battery circuits included in the battery string include:
a plurality of first battery circuits each including a battery classified as the first battery; and
a plurality of second battery circuits each including a battery classified as the second battery, when the first condition is satisfied, the control device transmits a first control command to the battery string, when the second condition is satisfied, the control device transmits a second control command to the battery string, when the battery string receives the first control command, the battery string drives the first switch and the second switch of each of the first battery circuits in such a manner that respective batteries included in the first battery circuits are connected to the power supply circuit, and when the battery string receives the second control command, the battery string drives the first switch and the second switch of each of the second battery circuits in such a manner that respective batteries included in the second battery circuits are connected to the power supply circuit.

* * * * *